(12) United States Patent
Vallabhaneni et al.

(10) Patent No.: US 10,999,368 B2
(45) Date of Patent: *May 4, 2021

(54) STORAGE MANAGEMENT OPERATIONS BASED ON EXECUTABLE FILES SERVED ON DEMAND TO STORAGE MANAGEMENT COMPONENTS

(71) Applicant: Commvault Systems, Inc., Tinton Falls, NJ (US)

(72) Inventors: Brahmaiah Vallabhaneni, Marlboro, NJ (US); Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/516,163

(22) Filed: Jul. 18, 2019

(65) Prior Publication Data

US 2019/0342387 A1    Nov. 7, 2019

Related U.S. Application Data

(63) Continuation of application No. 16/024,458, filed on Jun. 29, 2018, now Pat. No. 10,412,164, which is a
(Continued)

(51) Int. Cl.
*H04L 29/08*    (2006.01)

(52) U.S. Cl.
CPC ...... *H04L 67/1095* (2013.01); *H04L 67/1097* (2013.01); *H04L 67/2804* (2013.01)

(58) Field of Classification Search
CPC .. H04L 67/1095; H04L 67/1097; H04L 29/08
See application file for complete search history.

(56) References Cited

U.S. PATENT DOCUMENTS 4,084,231 A   4/1978   Capozzi et al.
4,267,568 A   5/1981   Dechant et al.
(Continued)

FOREIGN PATENT DOCUMENTS

AU   2004227949   10/2004
CA      2498174    3/2004
(Continued)

OTHER PUBLICATIONS

Arneson, "Mass Storage Archiving in Network Environments" IEEE, 1998, pp. 45-50.
(Continued)

*Primary Examiner* — Nicholas P Celani
(74) *Attorney, Agent, or Firm* — Commvault Systems, Inc.

(57) ABSTRACT

Systems and methods are disclosed for speedily upgrading (e.g., via service packs) components of a storage management system, such as media agents and data agents, which may number in the thousands. The disclosed methods and systems provide a lightweight and flexible approach. Executable files such as service packs are deployed to a network-shared file system and are served on demand to each targeted host computing device to launch a data agent and/or media agent component. New service packs (e.g., upgrades) are installed on another shared drive and the connection thereto is refreshed by each targeted storage management component to begin executing the new version on demand. The resultant overall upgrade process across the storage management system may be substantially shortened, and the network burden greatly reduced.

20 Claims, 14 Drawing Sheets

Related U.S. Application Data continuation of application No. 15/671,011, filed on Aug. 7, 2017, now Pat. No. 10,069,912, which is a continuation of application No. 15/413,249, filed on Jan. 23, 2017, now Pat. No. 9,800,656, which is a continuation of application No. 14/513,049, filed on Oct. 13, 2014, now Pat. No. 9,609,058.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiftler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran et al. | |
| 7,500,053 B1 | 3/2009 | Kavuri et al. | |
| 7,536,291 B1 | 5/2009 | Retnamma et al. | |
| 7,543,125 B2 | 6/2009 | Gokhale | |
| 7,546,324 B2 | 6/2009 | Prahlad et al. | |
| 7,577,722 B1 | 8/2009 | Khandekar et al. | |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,019,872 B2 | 9/2011 | Lora et al. | |
| 8,943,183 B2 | 1/2015 | Prahlad et al. | |
| 9,609,058 B2 | 3/2017 | Vallabhaneni et al. | |
| 9,710,253 B2 | 7/2017 | Bansod | |
| 9,800,656 B2 | 10/2017 | Vallabhaneni et al. | |
| 10,007,499 B2 | 6/2018 | Prahlad et al. | |
| 10,069,912 B2 | 9/2018 | Vallabhaneni et al. | |
| 10,101,991 B2 | 10/2018 | Bansod | |
| 2003/0200201 A1 | 10/2003 | Milius | |
| 2004/0255291 A1 | 12/2004 | Sierer et al. | |
| 2005/0039051 A1 | 2/2005 | Erofeev | |
| 2005/0177617 A1 | 8/2005 | Banginwar et al. | |
| 2006/0053261 A1 | 3/2006 | Prahlad et al. | |
| 2006/0053263 A1 | 3/2006 | Prahlad et al. | |
| 2006/0282831 A1 | 12/2006 | Toeroe | |
| 2009/0024993 A1 | 1/2009 | Reus et al. | |
| 2009/0089781 A1 | 4/2009 | Shingai et al. | |
| 2009/0144700 A1 | 6/2009 | Huff et al. | |
| 2009/0164201 A1 | 6/2009 | Celli et al. | |
| 2010/0131084 A1 | 5/2010 | Van Camp | |
| 2011/0138374 A1 | 6/2011 | Pal | |
| 2012/0054728 A1 | 3/2012 | Rohde et al. | |
| 2013/0275695 A1 | 10/2013 | Ponsford et al. | |
| 2014/0201725 A1* | 7/2014 | Tian | G06F 8/62 717/169 |
| 2015/0178063 A1 | 6/2015 | Narkinsky et al. | |
| 2016/0103671 A1 | 4/2016 | Curran et al. | |
| 2018/0375933 A1 | 12/2018 | Vallabhaneni et al. | |

FOREIGN PATENT DOCUMENTS

| | | |
|---|---|---|
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| EP | 1393181 | 3/2004 |
| GB | 2447361 | 9/2008 |
| JP | 4198050 | 12/2008 |
| JP | 4267443 | 5/2009 |
| WO | WO 1995/013580 | 5/1995 |
| WO | WO 1999/012098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Chan, "Essentials of Patch Management Policy and Practices", PatchManagement.org, Jan. 31, 2004, pp. 1-5.

Eitel, "Backup and Storage Management in Distributed Heterogenerous Environments", IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

(56) References Cited

OTHER PUBLICATIONS

Mendel Rosenblum Operating Systems Review (SIGOPS), vol. 25, No. 5, May 1991, New York, US, "The Design and Implementation of a Log-Structured File System", p. 4, paragraph 3.3-p. 5.

* cited by examiner

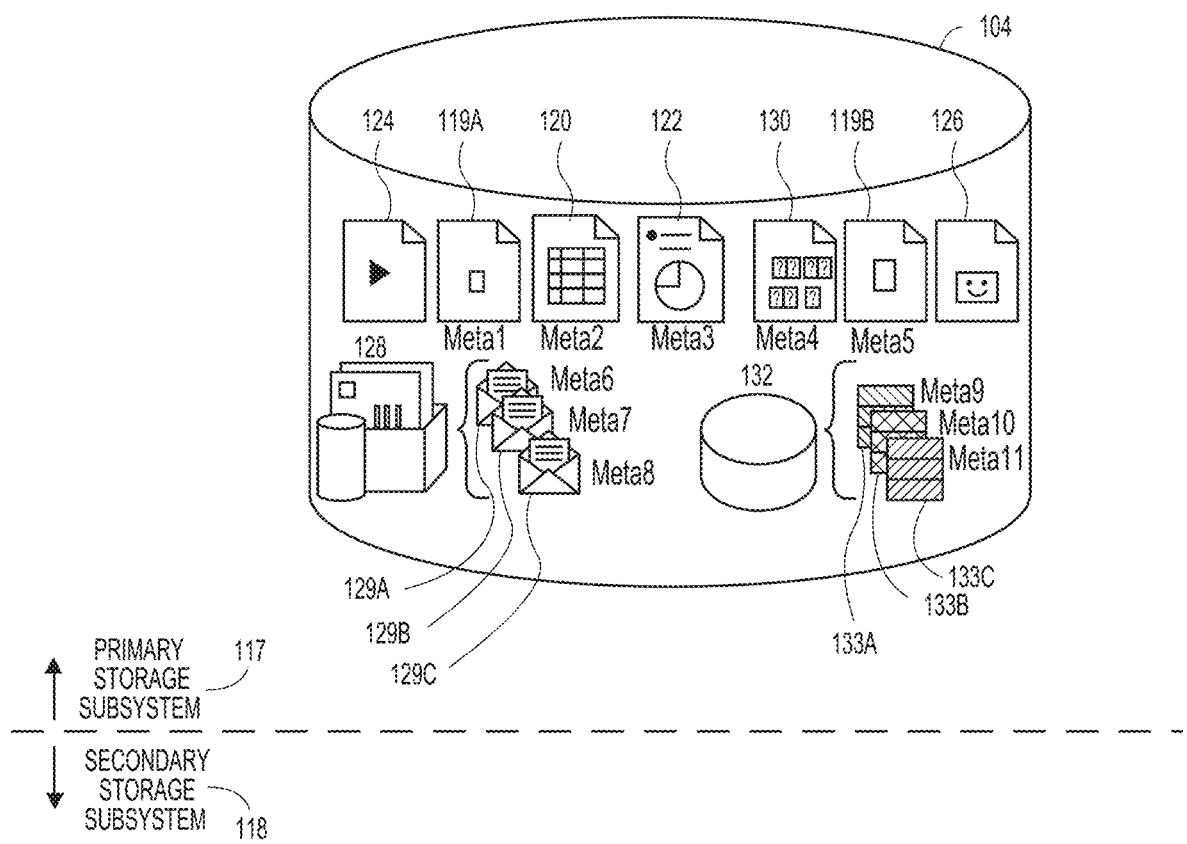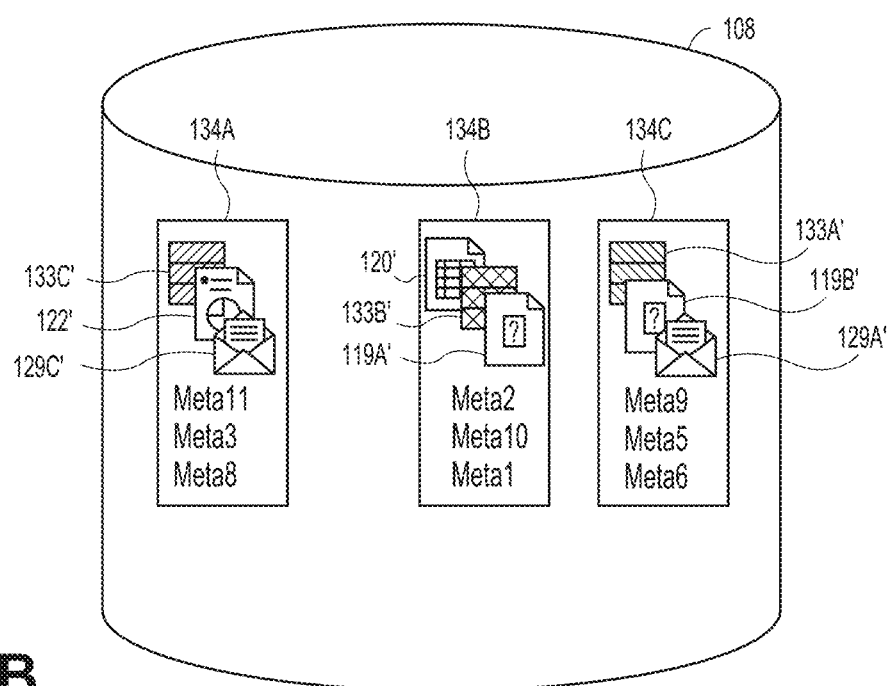
FIG. 1B

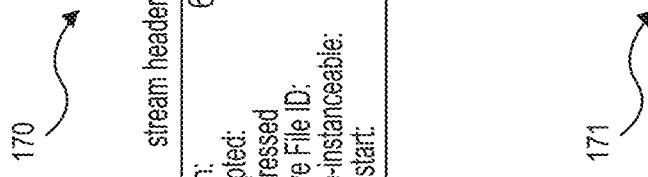

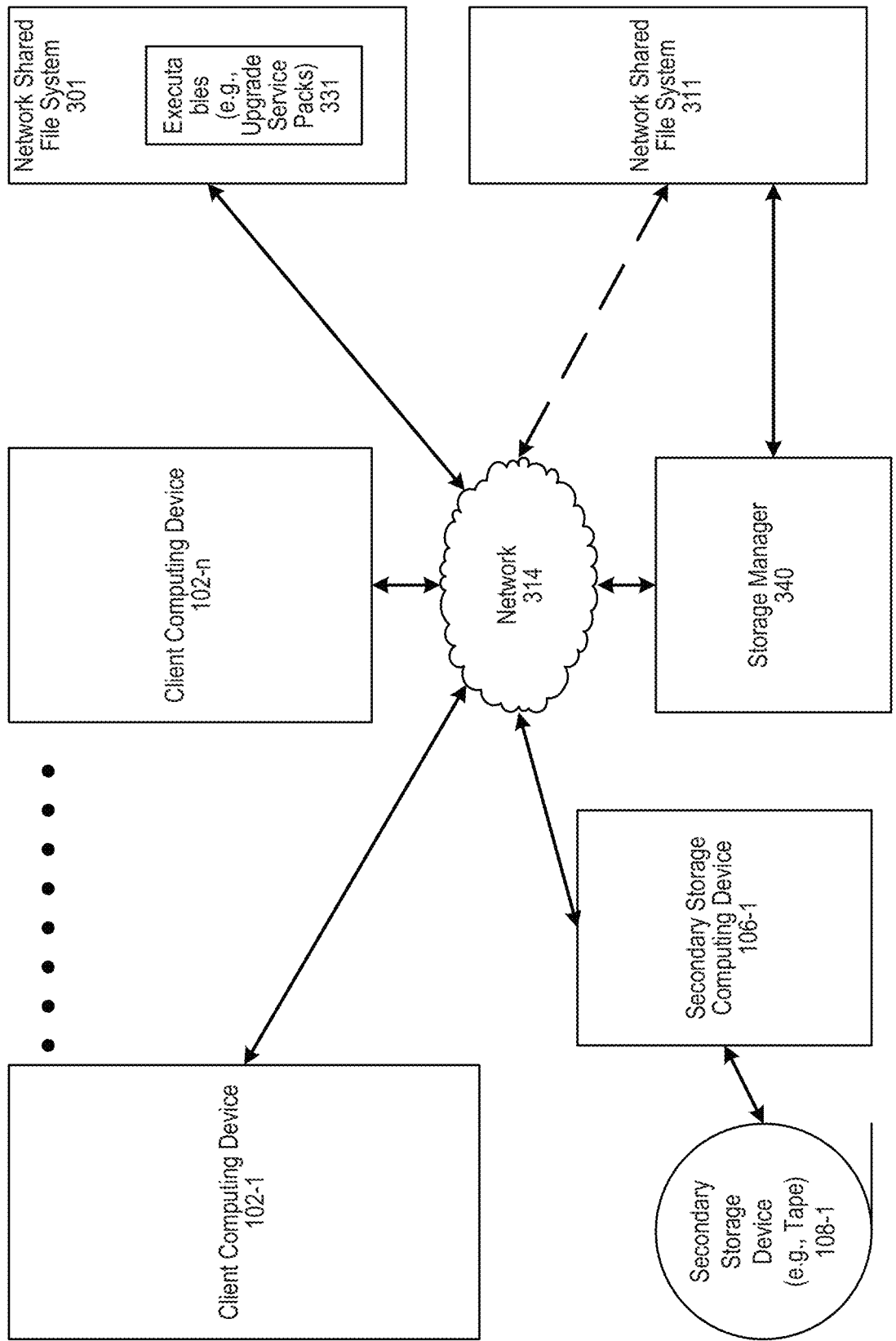
FIG. 3  System 300 For Performing Storage Mgmt. Ops. Based On Executables Served On Demand To Storage Mgmt. Components

STORAGE MANAGEMENT OPERATIONS BASED ON EXECUTABLE FILES SERVED ON DEMAND TO STORAGE MANAGEMENT COMPONENTS

INCORPORATION BY REFERENCE TO ANY PRIORITY APPLICATIONS

This application is a Continuation of U.S. patent application Ser. No. 16/024,458 filed on Jun. 29, 2018, which is a Continuation of U.S. patent application Ser. No. 15/671,011 filed on Aug. 7, 2017 and now U.S. Pat. No. 10,069,912, which is a Continuation of U.S. patent application Ser. No. 15/413,249 filed on Jan. 23, 2017 and now U.S. Pat. No. 9,800,656 B2, which is a Continuation of U.S. patent application Ser. No. 14/513,049 filed on Oct. 13, 2014 and now U.S. Pat. No. 9,609,058 B2. Any and all applications for which a foreign or domestic priority claim is identified in the Application Data Sheet of the present application are hereby incorporated by reference herein under 37 CFR 1.57.

BACKGROUND

Businesses worldwide recognize the commercial value of their data and seek reliable, cost-effective ways to protect the information stored on their computer networks while minimizing impact on productivity. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

In a large company, the number of computing systems to be protected may number in the thousands. Maintaining and upgrading thousands of components may take a toll on the system as a whole. For example, deploying service packs to upgrade each individual component takes up substantial bandwidth, burdens network traffic, causes substantial downtime in the targeted component, and also occupies substantial space in each component's local storage. A more efficient and streamlined approach is needed.

SUMMARY

The present inventors devised a lightweight and flexible approach which is particularly advantageous in larger storage management systems. Systems and methods are disclosed for deploying executable files to components of a storage management system, such as media agents and data agents.

The traditional approach to managing upgrades of storage management components is to deploy executable files (e.g., in the form of service packs) to each and every individual data agent and media agent that is a target of the upgrade. This approach is not limited to feature enhancements, but may also include diagnostic service packs, bugfix patches, and/or supplying any new and/or different release. The service pack is stored locally on the endpoint, e.g., on local disk. Each host computing device in the storage management system may host one or more data agents and/or media agents. The result is that distributing one or more service packs to thousands of host computing devices burdens network traffic and uses substantial bandwidth. Furthermore, during the time required to apply the upgrade supplied by the service pack, the storage management component (e.g., data agent, media agent) is in downtime. A huge multiplier effect exacerbates these problems when thousands of upgrades must be performed. Storage management operations, such as backup jobs, archive jobs, replication jobs, restore jobs, etc. may be affected as a result. The overall upgrade process is therefore relatively lengthy and takes a substantial toll on the availability and performance of the system as a whole. Moreover, storing the service packs on local disks uses up a lot of storage across the storage management system.

An advantageous solution to these prior-art drawbacks is provided by the illustrative embodiment of the present invention. Executable files (e.g., service packs) for one or more storage management components will be hosted on a central server (e.g., shared drive) and client computing devices shall attach to the share to start executing the respective component. New service packs are deployed by bringing down the current shared drive and exporting a second shared drive having the same designation; the second shared drive comprises the new service packs. Each client computing device (e.g., executing a data agent) will then refresh its connection to the shared drive, thus connecting to the second share. The storage management components will then execute off the new service packs, thus effectuating a relatively speedy upgrade process.

Service packs are deployed to a network-shared file system and are served on demand to each targeted host computing device that is about to launch a storage management component, e.g., data agent and/or media agent. No storage to local disk is required. Instead, the illustrative storage manager stores service pack(s) to a first network-shared file system that is not attached to the target components. It then communicates to the components targeted by the service packs. This may involve notifying a component that a new service pack is available, providing metadata, (e.g., where to store the results of storage management jobs, where to store the jobs log file, the install location on the first network-shared file system, etc.), instructing the component to release from the currently-attached (second) network-shared file system and attach instead to the first network-shared file system comprising the new service packs, and finally, instructing the component to stop executing and restart after refreshing its connection to the shared drive. At an appropriate time, the component begins executing based on the service pack being served off the newly-attached first network-shared file system (e.g., after refreshing the connection). The time may be pre-scheduled by the storage manager, may occur when a storage management operation is to begin, or may be launched immediately following the refresh/attach operation to the first network-shared file system.

In contrast to the prior art, the communications initiated by the storage manager to the targeted components comprise lightweight messages instead of service packs. As compared to the size of service packs, the difference may be measured in orders of magnitude. The load on the network is thus substantially reduced. Likewise, the time needed to release from one network-shared file system and attach to another is minimal, generally far less than applying the service packs according to the prior art. As a result, the overall upgrade process across the storage management system may be substantially shortened and improved by the illustrative embodiment. Advantages include substantially reduced bandwidth and/or network load and minimal downtime for refreshing the shared drive connection. Local storage also is greatly reduced, because service packs are not stored and maintained on local disk. Thus, storage management operations may be advantageously performed by upgraded components based on executable files served from a network-shared file system on demand.

BRIEF DESCRIPTION OF THE DRAWINGS

FIG. 1B is a detailed view of a primary storage device, a secondary storage device, and some examples of primary data and secondary copy data.

FIGS. 1F-1H are block diagrams illustrating suitable data structures that may be employed by the information management system.

FIG. 3 is a block diagram illustrating an exemplary configuration of a system 300 for performing storage management operations based on executable files served on demand to storage management components, according to an illustrative embodiment of the present invention.

DETAILED DESCRIPTION

Systems and methods are disclosed for performing storage management operations based on executable files served on demand to storage management components. Examples of such systems and methods are described in further detail herein, in reference to FIGS. 3-7. The disclosed components and functionality may be configured and/or incorporated into information management systems such as those described herein in FIGS. 1A-2B.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data. Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
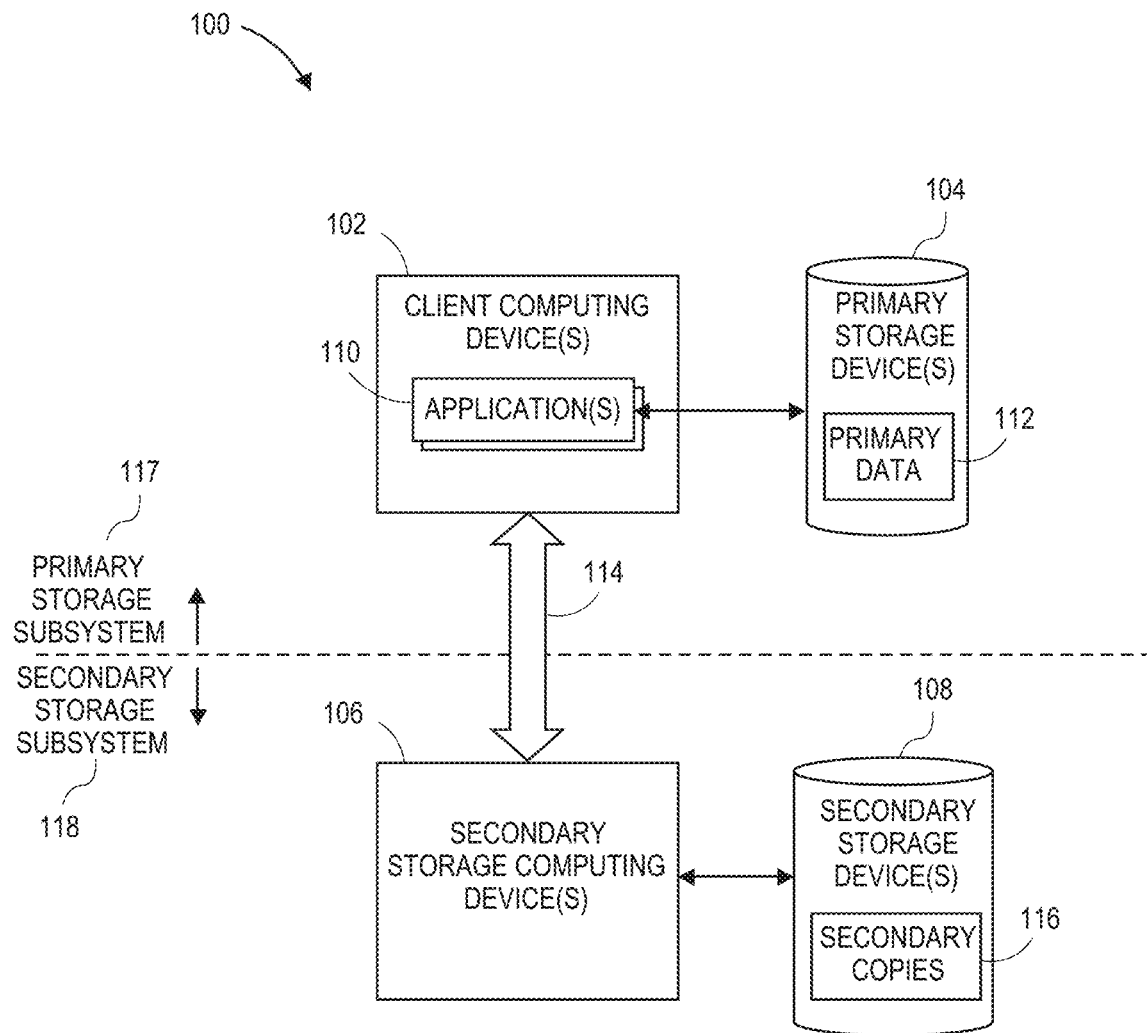
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object.

For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
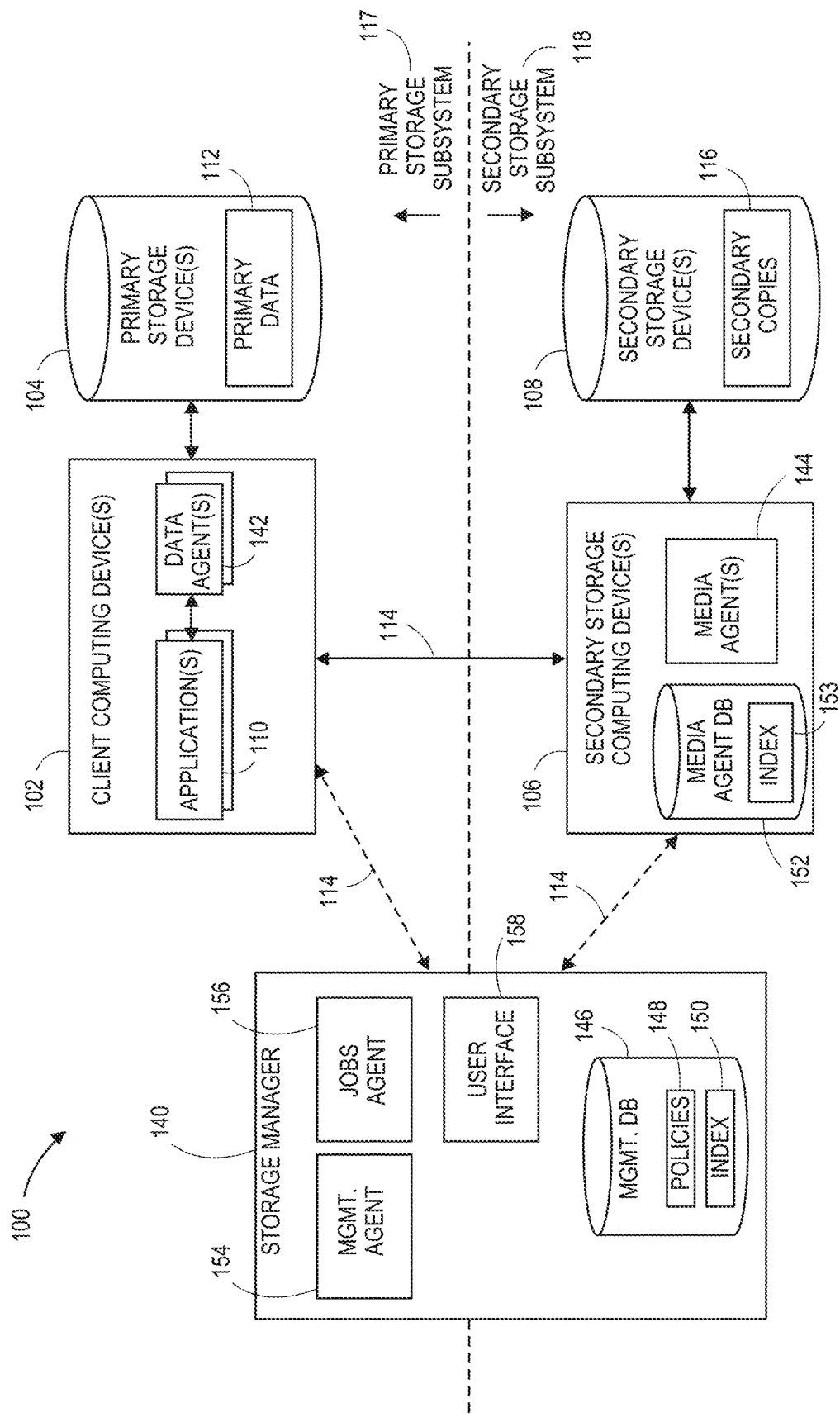
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:

initiating execution of secondary copy operations;

managing secondary storage devices 108 and inventory/capacity of the same;

reporting, searching, and/or classification of data in the information management system 100;

allocating secondary storage devices 108 for secondary storage operations;

monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
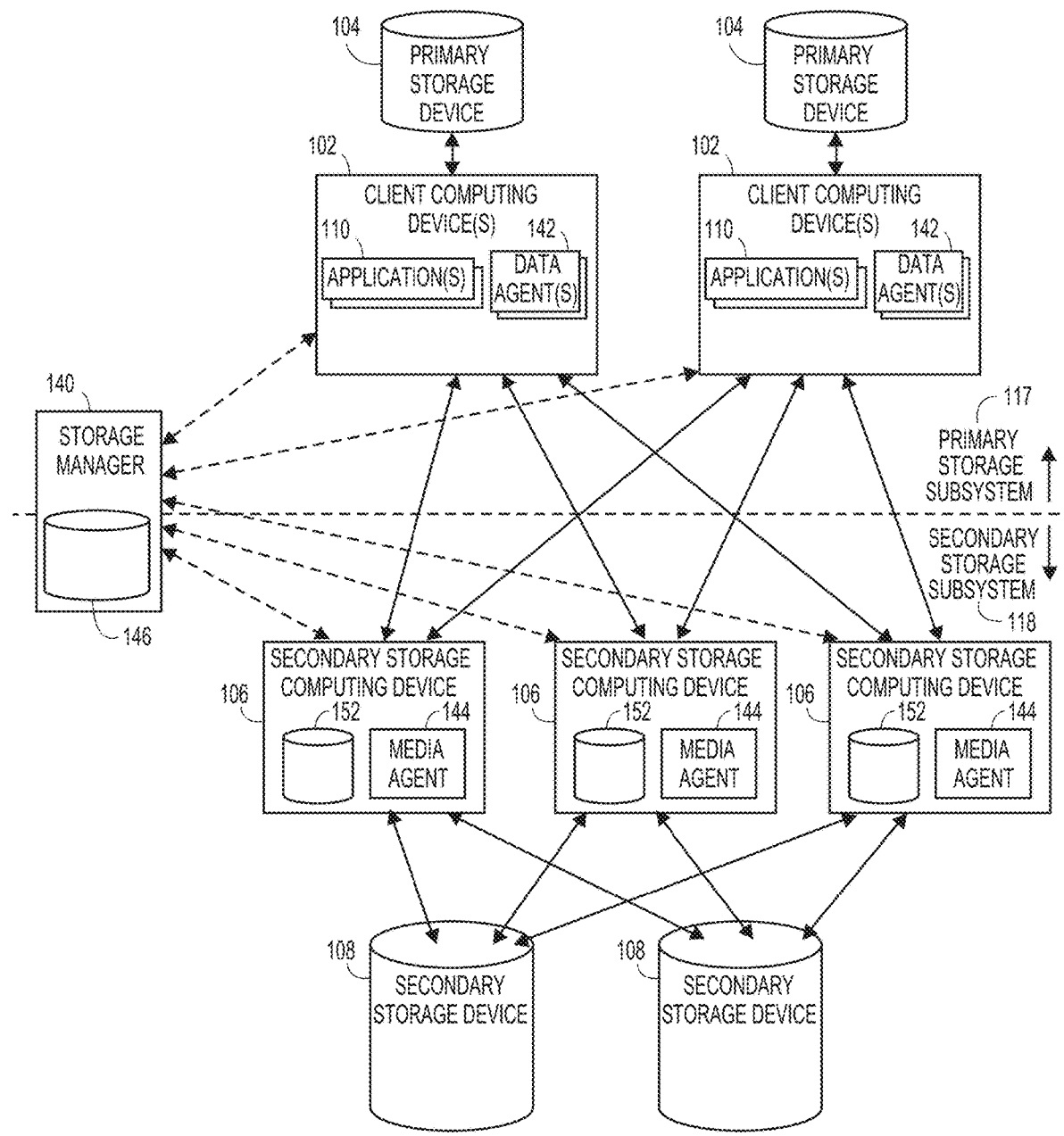
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
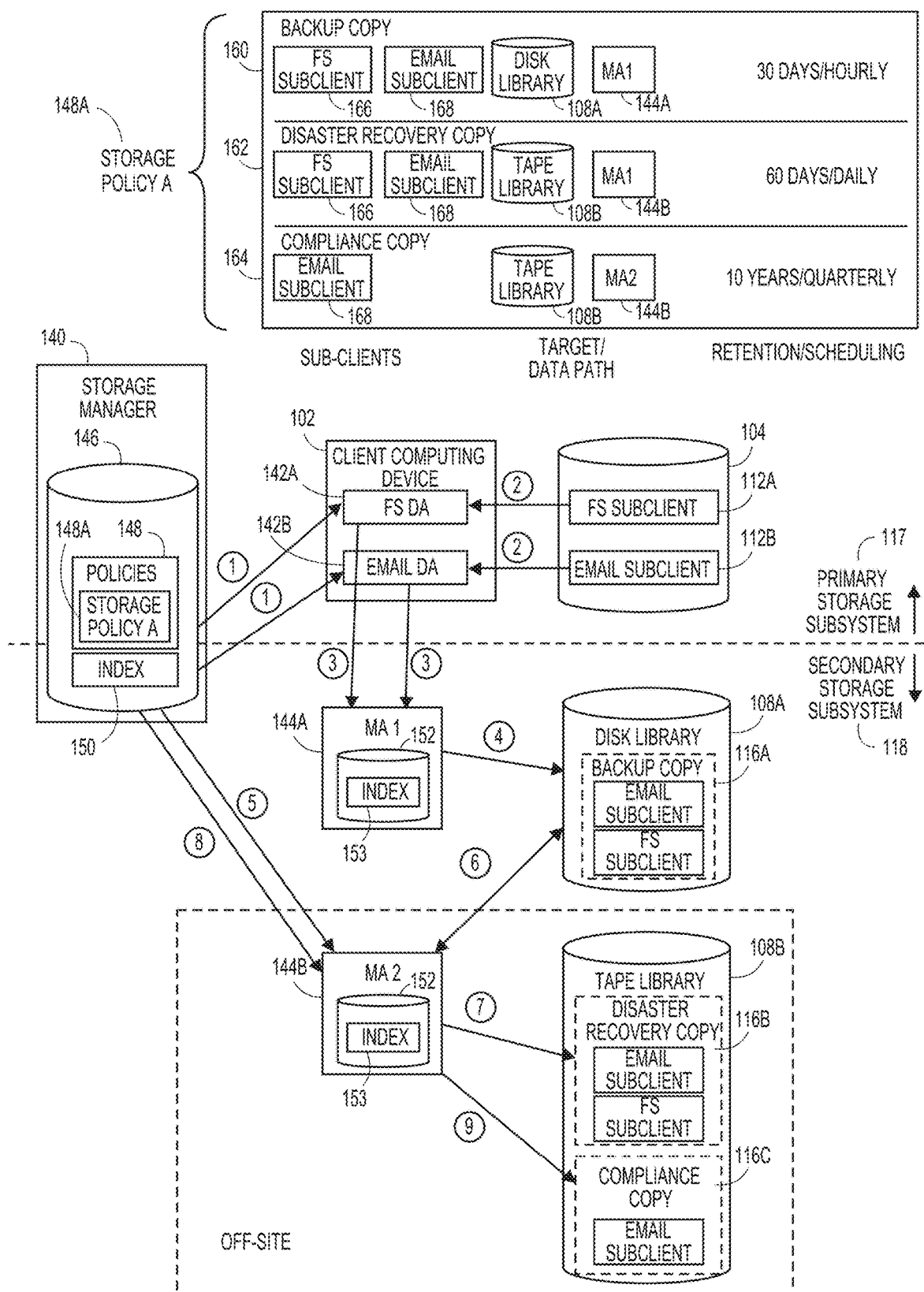
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112G, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 1126, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
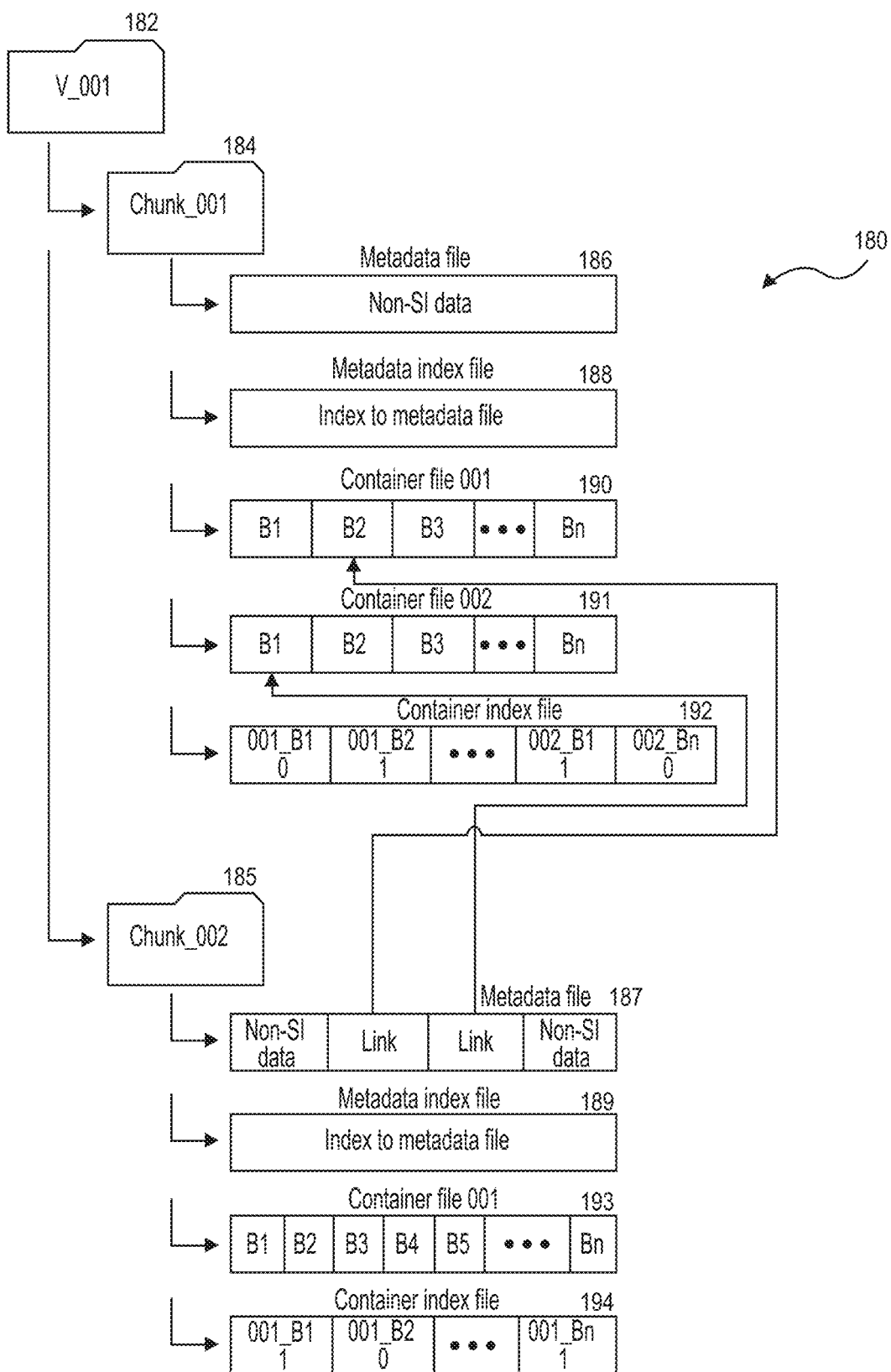

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Figure 2A:
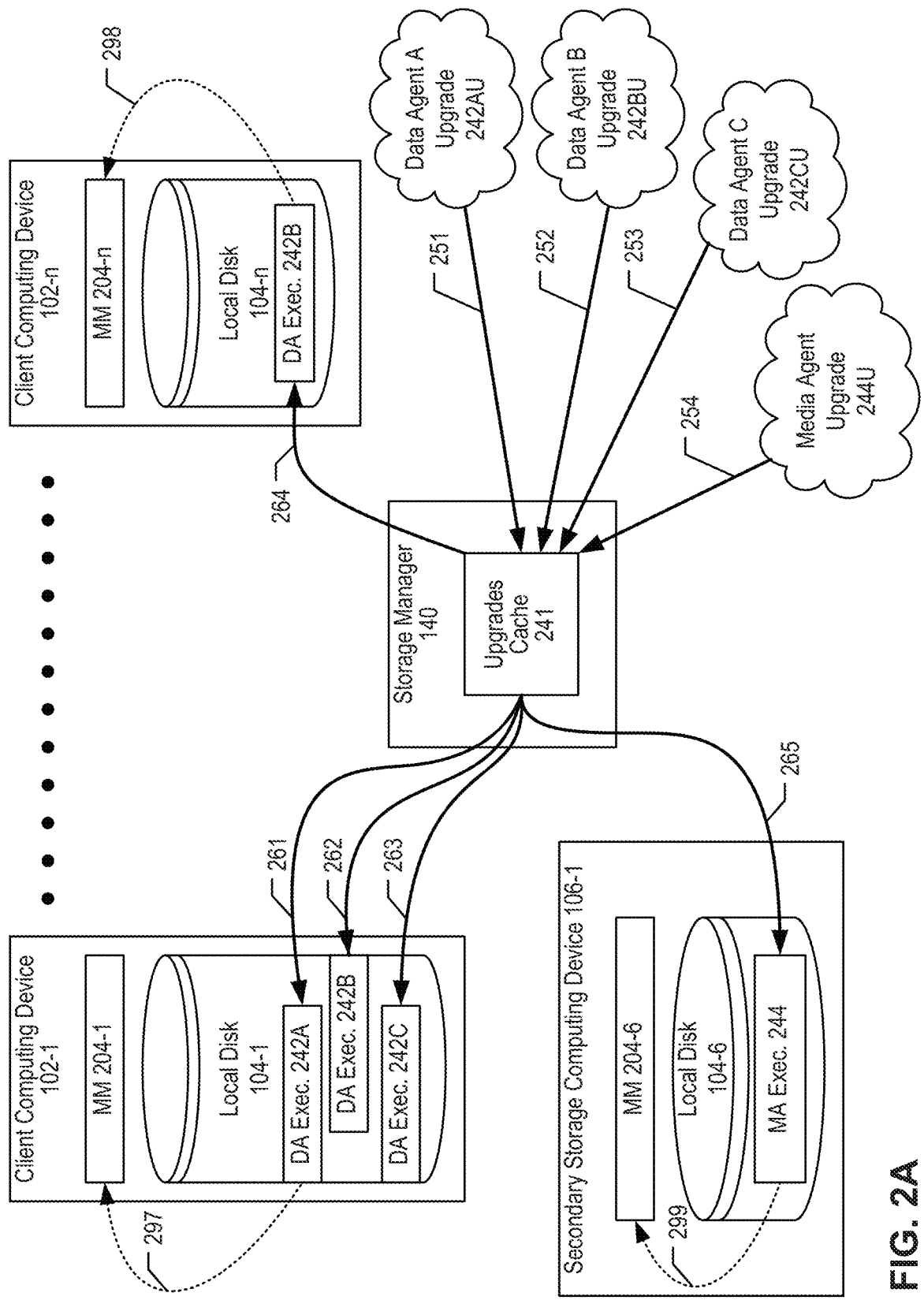
FIG. 2A is a block diagram illustrating some salient aspects of implementing upgrades to data agent and media agent components.

FIG. 2A is a block diagram illustrating some salient aspects of implementing upgrades to data agent and media agent components in system 100. Illustratively, the following components are depicted in the present figure: client computing devices 102 (e.g., 102-1, . . . , 102-n); secondary storage computing device 106 (e.g., 106-1); storage manager 140; and upgrades to one or more data agent and media agent components (e.g., data agent A upgrade 242AU, data agent B upgrade 242BU, data agent C upgrade 242CU, and media agent upgrade 244U). Logical operations 251-254, 261-265, and 297-299 will be described in more detail below.

Client computing device 102 was described in detail above. Secondary storage computing device 106 was also described in detail above. Client computing device 102 hosts one or more data agent ("DA") components of the storage management system. Secondary storage computing device 106 hosts one or more media agent ("MA") components of the storage management system. Some computing devices may host both data agent(s) and media agent(s) in some configurations. For simplicity hereinafter, one or more client computing device(s) 102 and/or secondary storage computing device(s) 106 may be referred to collectively as "DA/MA-host computing device(s)," or "host computing device(s)" or simply as "DA/MA host(s)."

Component 104 was also described in detail above. In particular reference to the present figure and the subsequent figures herein, component 104 may be a local disk that co-resides in the same chassis as component 102 or component 106. For example, a desktop computer may comprise both the computing element 102 and the local disk storage component 104. As shown in the present figure, local disk 104 comprises one or more executable file(s) of respective data agent(s) and/or media agent(s) that operate on the respective DA/MA host.

Storage manager 140 was described in more detail above. Storage manager manages system 100, which includes management of storage management operations throughout system 100. Storage manager 140 comprises upgrades cache 241.

Main memory 204 (e.g., MM 204-1, . . . , MM 204-n) is a main memory component (or internal memory) of client computing device 102 and secondary storage computing device 106, e.g., random-access memory (RAM). Stored program instructions from one or more executable file(s) execute out of main memory 204. Thus, every DA/MA host computing device comprises main memory 204. There is no limitation on the number of memory components (e.g., memory chips) that form a given main memory 204, and there is no limitation on the amount of main memory 204 (e.g., 8 GB RAM, etc.). As explained in regard to elements 297-299, executable file(s) are read into main memory 204 from local disk 104, so that the executable file(s) may be executed, e.g., data agents and media agents may operate.

Upgrades cache 241 is a memory component of storage manager 140, which is used by the storage manager to store received file(s) that are to be distributed to other components of system 100. In the present figure, storage manager 140 receives data agent and media agent upgrades into upgrades cache 241 which are then distributed to appropriate DA/MA host computing devices as explained below. Before distributing a given service pack, storage manager 140 may decompress and/or decrypt and/or otherwise process the received contents into executable files for distribution to the destination DA/MA hosts. There is no limitation to the amount of storage available and/or the number of files stored in upgrades cache 241.

Data agent upgrade file(s) 242AU, 242BU, and 242CU may comprise executable file(s) that are directed at particular data agent components of the storage management system. For example, file(s) 242AU are directed at "data agent A," which may be a data agent for Microsoft Exchange; file(s) 242BU are directed at "data agent B," which may be a data agent for a Linux file system; file(s) 242CU are directed at "data agent C," which may be a data agent for a Windows 2000 file system; etc. The files may be compressed and/or encrypted. A given set of executable file(s) directed at a certain component or type of component, e.g., 242AU, may be collectively referred to as a "service pack."

Media agent upgrade file(s) 244U may comprise executable file(s) that are directed at media agent components of the storage management system. The files may be compressed and/or encrypted. The file(s) may be collectively referred to as a "service pack."

Data agent executable file(s) 242A, 242B, and 242C may be identical to and/or extracted from the corresponding service pack delivered to the storage manager's upgrade cache 241 (e.g., uncompressed, decrypted, etc.). File(s) 242A, 242B, and 242C are stored in executable form in the local disk 104 of the targeted data agent host(s), e.g., "installed" to the target host computing device. Illustratively, both host 102-1 and 102-n in the present figure comprise data agent executable file(s) 242B, i.e., corresponding to data agent B. A "targeted" host computing device is defined here as one that hosts a data agent and/or media agent for which a service pack is provided. Likewise, a "targeted" data agent or media agent is one for which a service pack is provided, e.g., an upgrade, etc.

Media agent executable file(s) 244 may be identical to and/or extracted from the corresponding service pack delivered to the storage manager's upgrade cache 241 (e.g., uncompressed, decrypted, etc.). Thus file(s) 244 are stored in executable form in the local disk 104 of the targeted media agent host(s), e.g., "installed" to the target computing device. Illustratively, host 106-1 in the present figure comprises media agent executable file(s) 244.

Logical operations 251-254, which are supported by suitable underlying electronic communication pathways, represent the delivery of data agent and media agent service packs to storage manager upgrades cache 241. These operations may occur substantially concurrently or at different times, may be grouped into subsets, and need not be mutually synchronized.

Logical operations 261-265, which are supported by suitable underlying electronic communication pathways, represent the distribution of service packs by storage manager 140 to the targeted DA/MA host computing devices, where respective file(s) are stored on the local disk 104. Notably, each service pack must be distributed by storage manager 140 to each targeted DA/MA host computing device, which may mean thousands of transmissions. Distribution operations may occur substantially concurrently or at different times, may be grouped into subsets, and need not be mutually synchronized. For example, in a storage management system that comprises thousands of client computing devices, storage manager 140 may use a number of concurrent communication channels to distribute the service packs to groups of targeted hosts.

Logical operations 297-299 represent the way in which a given executable file(s) for a component is executed, i.e., the host computing device reads the executable file(s) into main memory 204 to execute the respective component, e.g., data agent or media agent. Thus, to execute data agent A, for example, client computing device 102-1 reads executable file(s) 242A from local disk 104-1 into main memory 204-1 so that an updated data agent A may execute. Correspondingly, data agent B may execute on client computing device 102-n based on reading executable(s) 242B into main memory 204-n. Correspondingly, a media agent may execute on secondary storage computing device 106-1 based on reading executable(s) 244 into main memory 204-6.

The configuration and distribution scheme described in FIG. 2A is characterized by some significant drawbacks in storage management systems that are very large, e.g., comprising thousands of DA/MA host computing devices. First, when thousands of DA/MA host computing devices are to receive service packs, storage manager 140 must repeat the distribution operation thousands of times. Even with multi-streaming or other parallel communication pathways, distributing one or more service packs to thousands of destinations requires vast amounts of bandwidth. For example, if a data agent is allocated roughly 2 GB on a client computing device, then storage manager 140 needs to distribute at least 2 TB of data to one thousand client computing devices. Transmitting 2 TB of data just to distribute service packs requires a lot of bandwidth and time to complete, by any measure.

Second, consider the fact that a given client computing device may comprise several distinct data agents, depending on the client's configuration and resident application(s) (e.g., one data agent for the file system and one for Active Directory, etc.). Consequently, storage manager 140 may need to distribute a service pack to the client computing device for each resident data agent thereon, thus having a multiplier effect over and above the exemplary 2 TB of data cited above. This will take more time and/or add to the load on the communications network(s) involved.

Third, after the service packs have been successfully distributed to the various DA/MA host computing devices, they must be applied to each targeted data agent and/or media agent. During this time, the respective data agents and media agents are in downtime, unable to service storage management operations. Depending on the extent of the upgrades in a given service pack, the downtime may be substantial and will add up to a significant amount of time that may place at risk the data which is to be protected.

In sum, the overall upgrade process is characterized by drawbacks in terms of downtime, bandwidth, and transmission time. These aspects are illustratively depicted in the timeline of FIG. 2B.

Figure 2B:
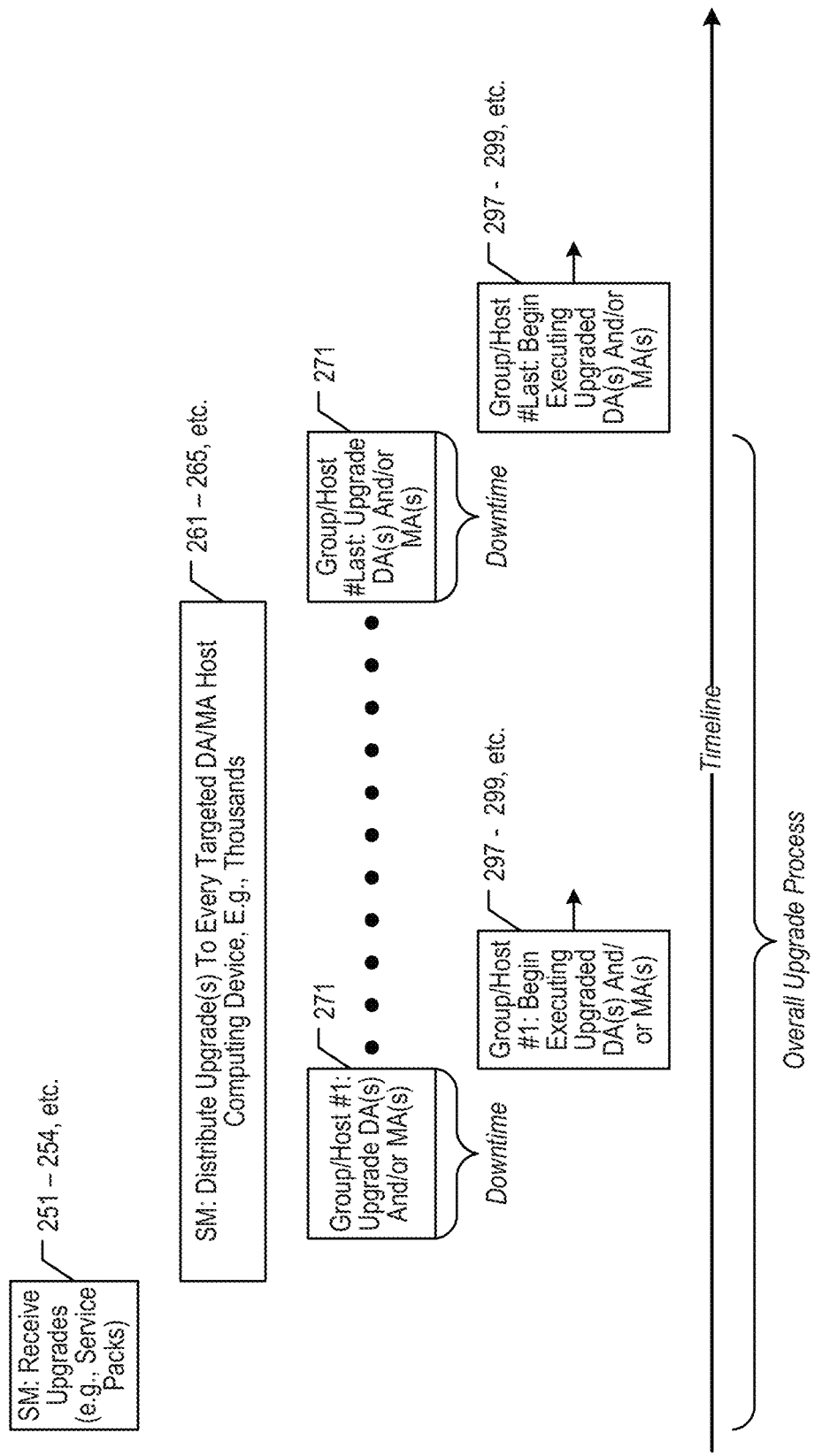
FIG. 2B is an illustrative timeline of the salient operations depicted in FIG. 2A.

FIG. 2B is an illustrative timeline of the salient operations depicted in FIG. 2A. The "overall upgrade process" is defined as beginning when storage manager 140 ("SM") receives one or more upgrades, such as service packs, and ends when the last host computing device or group thereof begins executing upgraded data agents and/or media agents, i.e., begins performing information/storage management operations after upgrade. The relative durations of the depicted blocks here are merely illustrative and are intended to enhance understanding. The numerical designations of the blocks correspond to elements of FIG. 2A.

Block 251-254 represents the storage manager 140 receiving the upgrades, e.g., in the form of service packs, which may be stored in upgrade cache 241.

Block 281-285 represents the storage manager 140 distributing (e.g., transmitting electronically) upgrades to each targeted DA/MA host computing device. The number of targeted DA/MA hosts may number in the thousands. The destinations may be grouped together to take advantage of parallel communication pathways and/or channels that may be available to storage manager 140. Nevertheless, the bandwidth required to support the distribution operation(s) for thousands of destinations will be substantial and relatively time consuming.

Blocks 271 represent the upgrade operations executed by each targeted DA/MA host as it applies the service pack(s) to the respective data agent(s) and/or media agent(s) residing thereon. As noted in the preceding figure, the respective data agent and/or media agent is in downtime for the duration of the upgrade. Even if a group's members implement upgrades substantially concurrently, a very large storage management system (e.g., thousands of host computing devices) will still comprise numerous groups that receive service packs in turn and then apply the upgrades. The total amount of downtime until the service pack upgrades have been propagated to all targeted data agents and/or media agents could be lengthy.

Blocks 297-299 represent a time when a given host computing device or group thereof begins executing upgraded data agents and/or media agents, i.e., begins performing information/storage management operation based on the distributed upgrades.

Thus, the drawbacks discussed in reference to FIG. 2A may be better understood by viewing the present figure. A need exists for a more efficient approach, which is discussed in further detail in reference to subsequent figures.

Storage Management Operations Based on Executable Files Served on Demand to Storage Management Components FIG. 3 is a block diagram illustrating an exemplary configuration of a system 300 for performing storage management operations based on executable files served on demand to storage management components, according to an illustrative embodiment of the present invention. Storage management system 300 is an embodiment of an information management system. System 300 illustratively comprises: client computing devices 102 (e.g., 102-1, . . . , 102-n); secondary storage computing devices 106 (e.g., 106-1); secondary storage devices 108 (e.g., 108-1) (e.g., tape drives, disk drives, etc.); network-shared file system 301, comprising executables 331; network-shared file system 311; storage manager 340; and network 314. The components may be interconnected as shown via network 314 and may have other connections. The physical communications infrastructure required to support these illustrative connections and network 314 is well known in the art and may be any suitable electronic communications infrastructure, such as described in regard to communication pathways 114 above. Other components of system 300, which are not shown in the present figures may include: other secondary storage devices 108 connected to respective secondary storage computing devices 106; storage arrays used for primary storage and/or snapshots by one or more client computing devices 102.

Network-shared file systems 301 and 311 may reside on one or more file-sharing servers (not shown), which may be known as network-attached storage or network-attached servers. An example of a network-shared file system (or "network share") may be a file system based on the "network file system" (NFS) protocol, which enables a computing device such as 102 and/or 106 to access files over a network as though the files were available from local storage such as local disk 104. Thus, network-shared file systems 301 and 311 may reside on distinct file-sharing servers or on the same server.

Network-shared file system 311 is shown with a dashed line to network 314 to illustrate that, according to the illustrative embodiment, it may not be logically "attached" to a given data agent, media agent, or DA/MA host. According to the illustrative embodiment, at any given time, a data agent, media agent, or DA/MA host may be logically attached to a designated network-shared file system, while the other network-shared file system may be logically "unattached" or "detached." Thus, as to a given data agent or media agent, a connection to the designated network-shared file system that serves executable files may logically toggle between network-shared file system 301 and 311. Logically detaching an attached network-shared file system may be referred to herein as "releasing." Depending on the configuration, user interface, and underlying technology, the attaching and releasing may be performed by one or more of the following components: storage manager 340, client computing device 102, secondary storage computing device 106, a data agent, and/or a media agent.

Executables 331 logically comprises one or more executable files, such as may be grouped into service packs targeted at a given data agent or media agent. The term "service pack" may be used herein to comprise executable files targeted to a certain version of a data agent or media agent. Executables 331 collectively represents the executable file(s) (or service packs) stored to network-shared file system 301, e.g., by storage manager 340. The contents of executables 331 comprise files that are in executable form, so that they may be read into main memory by a host computing device, e.g., 102, 106, etc., and executed thereafter. Executables 331 may or may not occupy contiguous storage space in network-shared file system 301.

Storage manager 340 is a storage manager that manages storage management system 300 in a manner analogous to storage manager 140 described above. Storage manager 340 additionally comprises functionality required to function within system 300, such as storing executables to network-shared file system 301 and instructing various components to perform certain tasks, including performing storage management operations.

Storage management operations are information management operations, as described in detail above, that occur in storage management system 300. Storage management operations may include data movement operations (e.g., backup, archive, snapshot, replication, deduplication, lifecycle management and hierarchical storage management, auxiliary copy and disaster recovery operations, etc.) and/or data analysis, reporting, and management operations (e.g., classification, encryption, compression, etc.). Storage management operations may be governed by information management policies.

System 300 may comprise any number of client computing devices 102, secondary storage computing devices 106, and network-shared file systems, interconnected by one or more networks 314 using suitable communications infrastructure and protocols. Client computing devices 102 may be organized into groups (not shown) for purposes of pushing messages thereto; likewise secondary storage computing devices also may be organized into groups. Many of the advantages of system 300 may be realized in systems that comprise thousands of client computing devices 102 and/or secondary storage computing devices 106.

Figure 4:
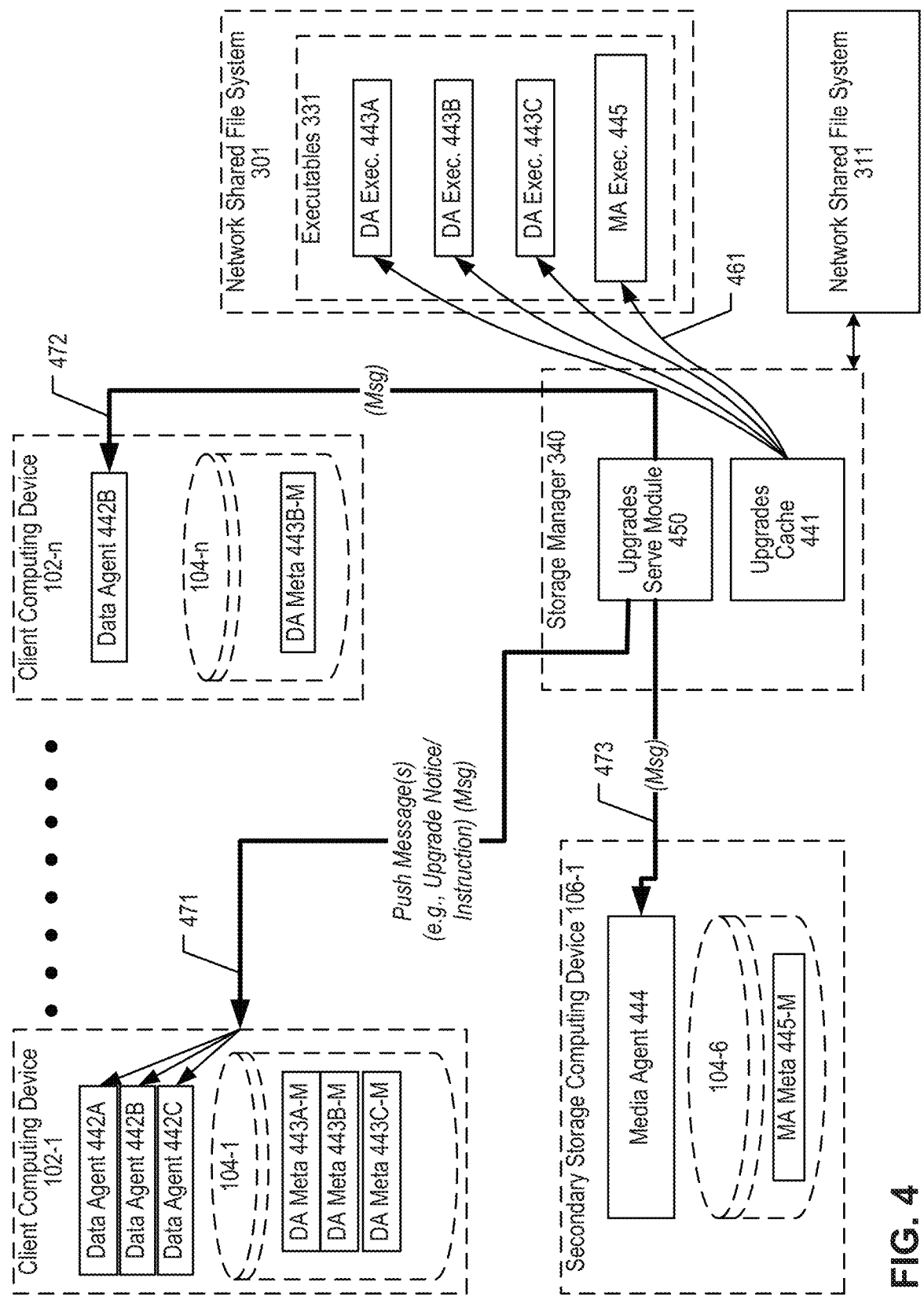
FIG. 4 is a block diagram illustrating some salient operations of system 300 according to the illustrative embodiment.

FIG. 4 is a block diagram illustrating some salient operations of system 300 according to the illustrative embodiment. FIG. 4 depicts: upgrades cache 441 and upgrades serve module 450 in storage manager 340; data agents 442A, 442B, and 442C executing on client computing device 102-1, and metadata file(s) 443A-M, 443B-M, and 443C-M stored on local disk 104-1; data agent 442B executing on client computing device 102-n, and metadata file(s) 443B-M stored on local disk 104-n; media agent 444 executing on secondary storage computing device 106-1, and metadata file(s) 445-M in local disk 104-6; executable file(s) 443A, 443B, and 443C for different data agents, and executable file(s) 445 for a media agent on network-shared file system 301 (collectively represented by executables 331); and network-shared file system 311.

Network-shared file system 301, at this stage of operations, is configured as logically detached from the depicted data agents 442 and media agent 444. Network-shared file system 301 receives executables (e.g., via communication pathway 461) that are to be later served to the respective data agents and media agents for execution on their host computing devices.

Network-shared file system 311 may be logically attached at this stage of operations to the depicted data agents 442 and media agent 444, and may have served executables thereto. Alternatively, executables may have been served to the respective data agents and/or media agents by another network-shared file system (not shown).

Upgrades cache 441 is analogous to upgrades cache 241 and may further comprise additional storage or configuration parameters required to operate within system 300. In general, upgrades cache 441 stores upgrade files (e.g., 242AU, 242BU, 242CU, 244U) received by storage manager 340, which are to be deployed to components such as data agents and media agents in system 300. Component 441 is called an "upgrades" cache for convenience, but the files stored therein need not be strictly upgrades. The term "upgrade" is used here to enhance understanding of system 300, but may refer to any version of software and/or firmware that is different from what is currently installed, and not necessarily a later or enhanced release. For example, files stored in upgrades cache 441 may represent an earlier version of software (downgrade), a version with diagnostic code, one or more patches to a current release, or an enhancement comprising additional features and functions above and beyond the currently installed release.

Data agents 442A, 442B, and 442C are data agents analogous to data agent(s) 142 described above, and additionally comprise functionality needed to operate within system 300, such as some of the data agent functionality described in method 600 herein (see, e.g., block 605 in method 600). Illustratively data agents 442A, 442B, and 442C are operational, executing on client computing device 102-1, and performing storage management operations. Likewise, data agent 442B is operational, executing on client computing device 102-n, and performing storage management operations. For instance, a data agent 442 may take part in performing data storage operations such as the copying, archiving, migrating, and/or replicating of primary data. A data agent 442 may receive control information from the storage manager 340, such as commands to transfer copies of data objects, metadata, and other payload data to media agent 444.

Data agents 442A, 442B, and 442C are different kinds of data agents. For example, data agent 442A may be a file system data agent and data agent 442B may be directed at an application 110 or virtual machine executing on the host computing device. There is no limitation on the number and kind of data agents that may be operating on a client computing device 102 in system 300.

Metadata file(s) 443A-M, 443B-M, 443C-M, and 445-M pertain to the corresponding executable file(s) stored on network-shared file system 301. Thus metadata file 443A-M corresponds to executable file(s) 443A; metadata file 443B-M corresponds to executable file(s) 443B; and metadata file 443C-M corresponds to executable file(s) 443C. Likewise metadata file 445-M corresponds to executable file(s) 445. Illustrative contents of a metadata file may include without limitation: the identity of a folder where the results of storage management jobs are to be stored; the location of the jobs log file; the install location of the respective data/media agent, e.g., on network-shared file system 301, on network-shared file system 311, etc.; a release or version identifier; etc. The metadata stored in a metadata file such as 443A-M may comprise metadata received from the storage manager (e.g., via operations 471-473) and/or metadata generated by the receiving data agent 442 or media agent 444 (e.g., time of day, storage manager identity, current release of data agent/media agent, etc.). In regard to the storage manager-transmitted metadata, it may result from one or more user administration operations, e.g., specifying parameters, timing, etc.

Media agent 444 is a media agent analogous to media agent 144 described in more detail above, and additionally comprises functionality needed to operate in system 300, such as some of the media agent functionality described in method 600 herein (see, e.g., block 605). There is no limitation on the kind of media agent that may be operating on a given secondary storage computing device 106 in system 300. Media agent 244 is operational, executing on secondary storage computing device 106-1, and performing storage management operations, for example moving data received from one or more data agents 442 to secondary storage device 108-1.

Executable file(s) 443A, 443B, 443C, and 445 are stored here in executable form (e.g., binaries) and may be grouped and/or linked together based on the respective target. Illustratively, executable file(s) 443A are for data agent A; executable file(s) 443B are for data agent B; executable file(s) 443C are for data agent C; and executable file(s) 445 are for a media agent. There is no limit on the number and type of executable file(s) in network-shared file system 301.

Upgrades serve module 450 is a functional component of storage manager 340, and may be implemented as executable software and/or firmware, which executes on the underlying computing device that hosts storage manager 340. When it executes according to the illustrative embodiment, module 450 is largely responsible for interoperating with network-shared file system 301 and network-shared file system 311, and communicating with the targeted data agent and media agents that are targeted by the upgrades in executables 331. For example, upgrades serve module 450 may transmit messages to data agents and media agents in system 300 (see, e.g., 471, 472, 473); upgrades serve module 450 also may transmit messages to the respective DA/MA hosts (e.g., 102, 106) instructing them to activate a data/media agent by executing respective executable file(s) from network-shared file system 301, thus completing the upgrade operation. Module 450 also may process upgrades files (e.g., 242AU, 242BU, 242CU, 244U) received in upgrades cache 441 before storage to network-shared file system 301 is possible, for example decompressing, decrypting, unpacking, classifying, etc. the received files. Module 450 also may extract relevant metadata from an upgrades file, such as a release number, a data, a source identifier, etc. After processing an incoming upgrades file, module 450 may then store the appropriate executable file(s) to network-shared file system 301 as illustrated by operation 461. More details are presented in subsequent figures and in regard to FIG. 600 herein.

Upgrades serve module 450 is shown herein as a distinct component to ease understanding of the present disclosure, however, alternative embodiments are also possible within the scope of the present invention. Module 450 may be embodied as a unified module within storage manager 340, layered on existing storage manager code, or may be a logical construct whose functionality is distributed through one or more other functional modules of the storage manager, such as management agent 154 and/or jobs agent 156—and in any combination thereof. In some alternative embodiments, module 450 may execute on another computing component that is physically distinct from storage manager 340, such as on a dedicated server that operates in conjunction with storage manager 340, but which may or may not be a logical component of storage manager 340.

In regard to the functionality of storage manager 340 and its role in system 300, the enumerated functionality given above is presented without limitation, and it will be understood by those having ordinary skill in the art, after reading the present disclosure, that substantial additional functionality is enabled by the architecture of storage management system 300 and its components, according to the exemplary embodiment and other alternative embodiments.

A few salient logical operations are depicted by arrows, e.g., 461, 471-473; these operations are not exhaustive as to system 300, and are presented here to enhance understanding of the illustrative embodiment.

In logical operation 461, storage manager 340 (e.g., using module 450), stores executable file(s) 445 to network-shared file system 301 after appropriate processing of the received upgrade file(s) (e.g., decompress, decrypt, unpack, classify, extract metadata, etc.). Likewise, using the same or another suitable communications pathway, storage manager 340 stores executable file(s) 443A, 443B, and 443C to network-shared file system 301 after processing the respective received upgrade file(s).

In logical operations 471, 472, and 473, storage manager 340 (e.g., using module 450) transmits ("pushes") one or more messages to data agents and media agents in system 300 that are targeted by the upgrade files (i.e., the upgrades' targeted components). Untargeted data agents and media agents will not be upgraded and therefore need not be communicated to. The one or more messages transmitted by storage manager 340 to an targeted data/media agent may take the form of one or more instructions, commands, operational parameters, metadata, upgrade notices, and/or any combination thereof, without limitation.

The one or more messages may comprise metadata pertaining to the executable file(s) (e.g., 443A, 443B, 443B, 445) that affect the respective data agent or media agent. Thus, metadata about executable file(s) 443A would be transmitted to data agent(s) 442A throughout system 300. The metadata is then stored to the corresponding metadata file in local storage 104, e.g., metadata file 443A-M. The one or more messages may also comprise a parameter that indicates that the receiving data/media agent is to complete ongoing storage management operation(s) before upgrading. A timing parameter may indicate a time when the upgrade may begin.

Figure 5:
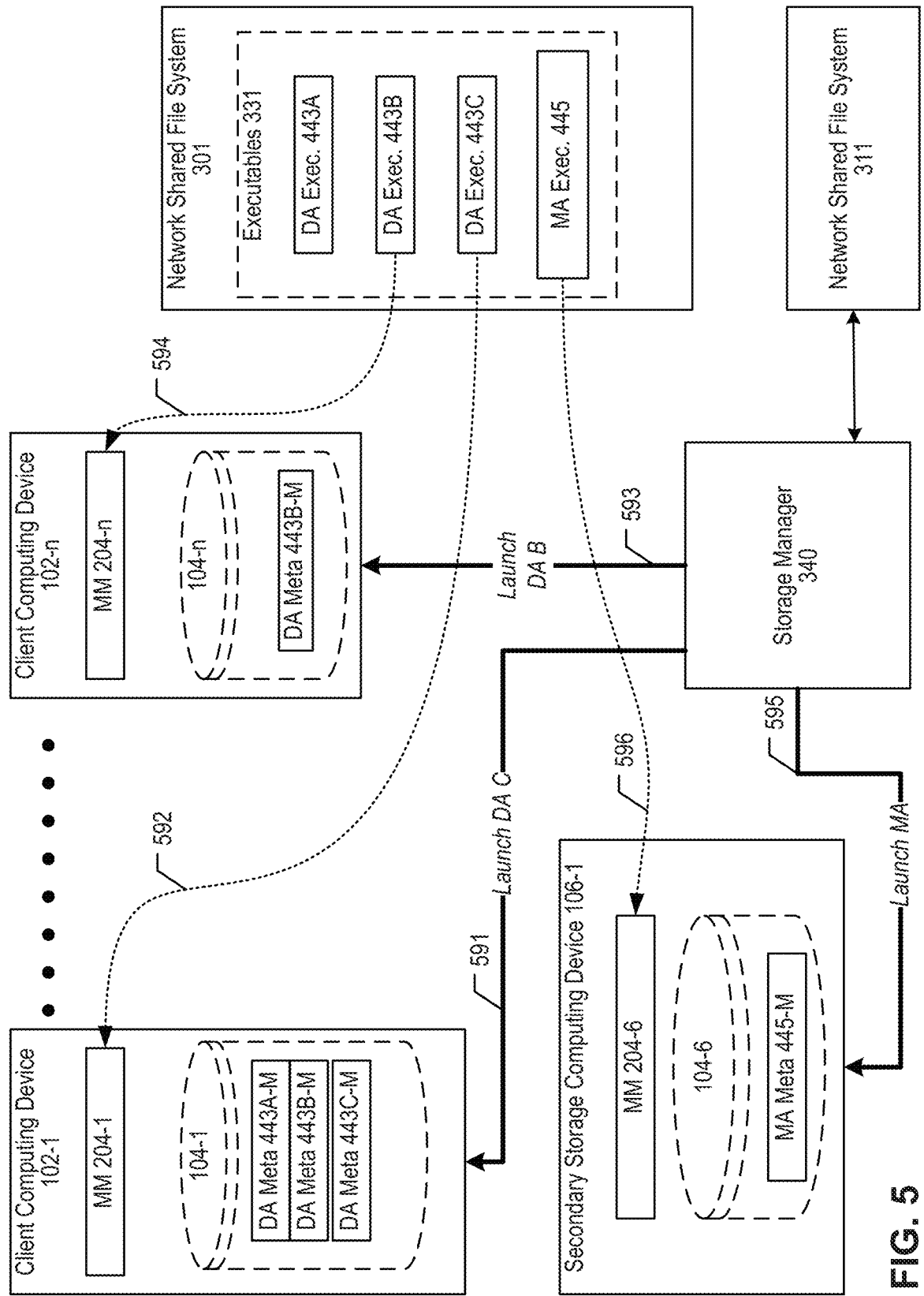
FIG. 5 is a block diagram illustrating additional salient operations of system 300 according to the illustrative embodiment.

FIG. 5 is a block diagram illustrating additional salient operations of system 300 according to the illustrative embodiment. FIG. 5 depicts system 300 after the operations of FIG. 4 have completed. Although not expressly depicted, at this stage of operations, network-shared file system 301 is configured as "attached" to the depicted components (see, e.g., block 605 in method 600), while the other network-shared file system 311 is "detached." In addition to the components illustrated in FIG. 4, FIG. 5 further illustrates: main memory 204 in each of the host computing devices 102 and 106; illustrative logical operations depicted by arrows, e.g., 591-596.

Main memory 204, which is a main memory component of each host computing device, was described in more detail earlier. In reference to system 300, in contrast to FIG. 2, executable file(s) are read into main memory 204 from an attached network-shared file system (e.g., 301) so that the executable file(s) may be executed. Thus, data agents and media agents in system 300 may perform storage management operations based on executable files that are served from the network-shared file system. This is shown by logical operations 592, 594, and 596, which are directed at client computing device 102-1, client computing device 102-n, and secondary storage computing 106-1, respectively.

A few salient logical operations are depicted by arrows, e.g., 591-596; these operations are not exhaustive as to system 300, and are presented here to enhance understanding of the illustrative embodiment.

Logical operations 591, 593, and 595 depict messages transmitted by storage manager 340 to the respective host computing devices (e.g., 102, 106) to launch execution of data agents 443 and media agents 445. For example, in operation 591, one or more messages may be sent to client computing device 102-1 to execute data agent C (based on executables 443C served from network-shared file system 301). In some embodiments, this operation may be distinct from the operations 471-473 depicted in FIG. 4, i.e., may occur after the network-shared file system 301 has been attached (see, e.g., block 605 in method 600). In some alternative embodiments, operations 591, 593, and 595 and their constituent message(s) may be subsumed in operations 471-473, such that operations 471-473 may further comprise instructions to launch the upgraded data agents and media agents after the counterparts have stopped executing.

Logical operations 592, 594, and 596 depict how executable files for data agents and media agents are served to host computing devices from the attached network-shared file system (e.g., 301); this way, the executables are served off the network-shared file system rather than from local disk 104. Serving the executables may be done on demand, based on operations 591, 593, and 595. As explained earlier, storage manager 340 is generally responsible for managing system 300, which may include timing and other operational parameters relating to when upgrades (in executables 443 and 445) are to be deployed to the host computing devices 102 and 106.

There is no limitation on how many data agents 443 or media agents 445 may be served from the attached network-shared file system to one or more host computing devices 102 and/or 106. Likewise, there is no limit on how many data agents and/or media agents may execute substantially concurrently on any given host computing device in system 300.

Figure 6:
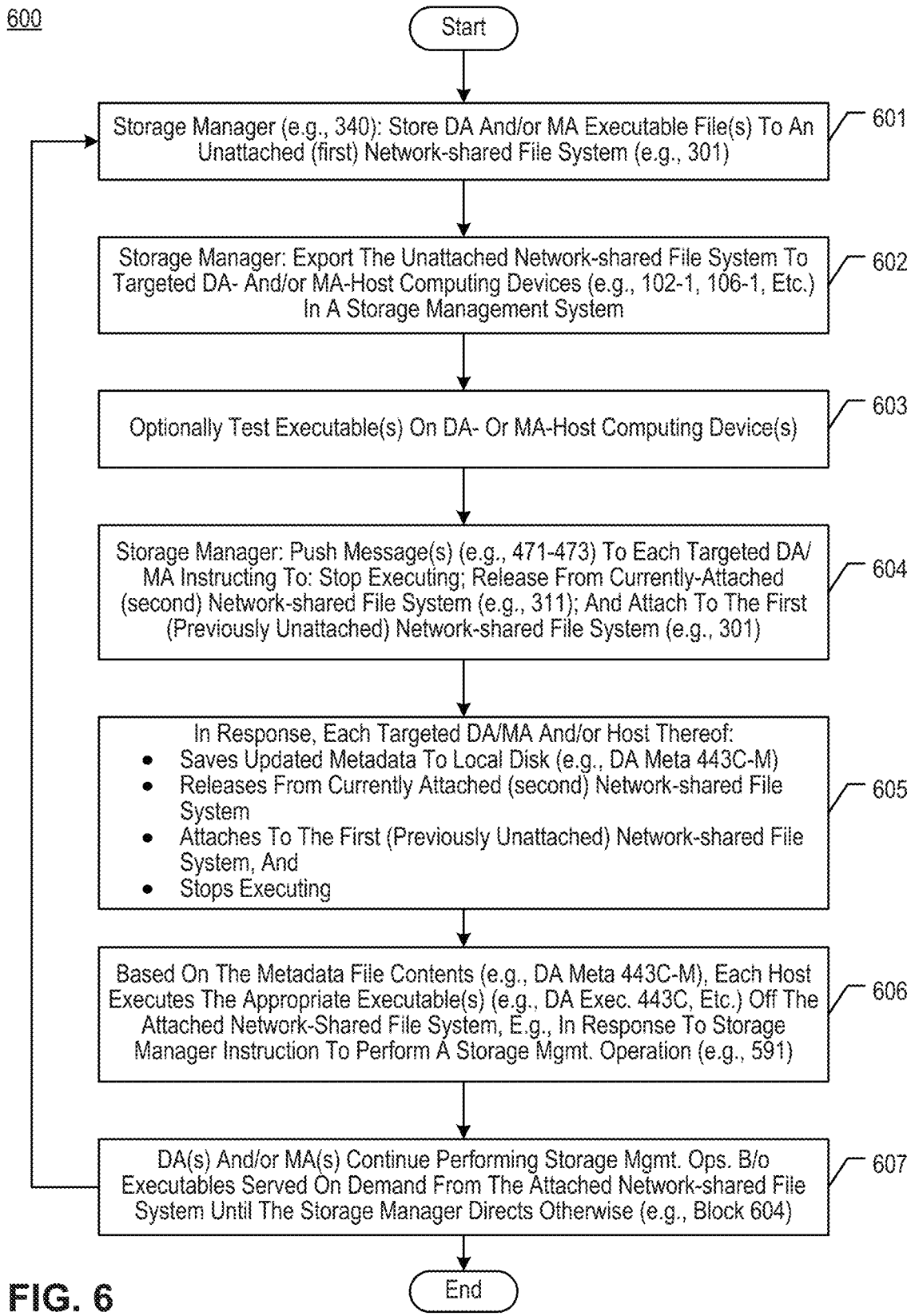
FIG. 6 depicts some salient operations of a method 600 according to an illustrative embodiment of the present invention.

FIG. 6 depicts some salient operations of a method 600 according to an illustrative embodiment of the present invention. In general, method 600 may be performed by one or more components of system 300, operating individually or in cooperation with each other, as explained further below. Method 600 may be directed at upgrading a storage management component (e.g., data agent, media agent) that executes on a host computing device in a storage management system from a second version to a first version, wherein the upgrading may be based on refreshing a connection to a designated network-shared file system; and/or based on releasing one shared drive and attaching to another shared drive that comprises the desired executables of the first version of the storage management component.

At block 601, storage manager 340 stores one more executable files for data agent(s) and/or media agent(s) (e.g., 443A, 443B, 443C, 445) to a first network-shared file system (e.g., 301), which is initially configured as detached or unattached from the targeted data agent(s) and media agent(s) operating in the system.

At block 602, storage manager 340 exports the unattached network-shared file system, e.g., 301. This operation enables the sharing of network-shared file system 301 to the targeted DA/MA hosts (e.g., 102-1, 106-1, etc.) in system 300. Illustratively, the network-shared file systems may be designated with the same name/designation, so that the switch-over from one share to another may be as transparent as possible to the respective target host computing devices and storage management components thereon.

At block 603, which may be optionally implemented by some customers before the upgrades are promulgated throughout system 300, one or more executable files (e.g., 443A, 443B, 443C, 445) may be tested on one or more host computing devices designated as testbeds. For example, the customer may set up a test client computing device 102 and proceed through the rest of method 600 to test a data agent upgrade, e.g., 443A. Detaching from one network-shared file system and attaching to another need not be synchronized among target host computing devices.

At block 604, storage manager 340 may push one or more messages to each targeted data agent and/or media agent (see, e.g., operations 471-473 in FIG. 4). The one or more messages may take the form of one or more instructions, commands, operational parameters, metadata, upgrade notices, and/or any combination thereof, without limitation. For example, the one or more messages may instruct the recipient to: release the currently-attached network-shared file system (e.g., 311) and attach instead to the network-shared file system that comprises the upgrade executables (e.g., 301), and stop executing the respective targeted data agent and/or media agent (e.g., stop immediately, stop after active storage management job(s) complete, stop at a certain time of day or at another trigger point). The messages also may comprise metadata pertaining to the executables, which is to be written to a metadata file on local disk 104 at the targeted host computing device. The metadata is to be used subsequently to launch execution of the upgraded data agent and/or media agent. The messages also may comprise an operational parameter that shall subsequently trigger execution of the upgraded data agent and/or media agent.

At block 605, the targeted host computing device and/or storage management component performs as instructed at block 604. For example, one more of the following operations may occur: the targeted data agent and/or media agent may save updated metadata to a metadata file on local disk 104, e.g., 443A-M, etc.; the currently-attached network-shared file system (e.g., 311) may be released; the indicated network-shared file system (e.g., 301) may be attached and/or the connection to a shared drive refreshed; and the targeted data agent and/or media agent may timely stop executing and/or restart based on the stored metadata.

At block 606, each targeted host computing device may begin executing. Effectively, an upgraded data agent and/or media agent component begins executing at this point, based on the stored metadata (e.g., 443C-M, 445-M, etc.). As noted earlier, this is made possible by the targeted host computing device reading the upgrade executables into main memory from the attached network-shared file system. Execution may be triggered by a restart instruction issued at block 604. Execution may be triggered by an instruction from storage manager 340, such as a timed trigger, to begin executing the data agent and/or media agent at a certain time. Execution also may be triggered by an instruction issued by storage manager 340 to immediately begin a certain storage management operation, such as a backup job. Thus, the storage management operation may be said to be based on the executable files being served on demand to the respective data agent and/or media agent.

At block 607, the upgraded data agents and media agents continue to perform storage management operations that may have been launched at block 606, based at least in part on the executable file(s) served on demand from the attached network-shared file system—until storage manager 340 directs otherwise (see, e.g., block 604). In sum, according to method 600, system 300 may upgrade any number of data agents and media agent using executable files, based on the executable files being served on demand from a network-shared file system.

After block 607, control may return to block 601 for promulgating another round of service packs, this time from another network-shared file system, e.g., 311.

Figure 7:
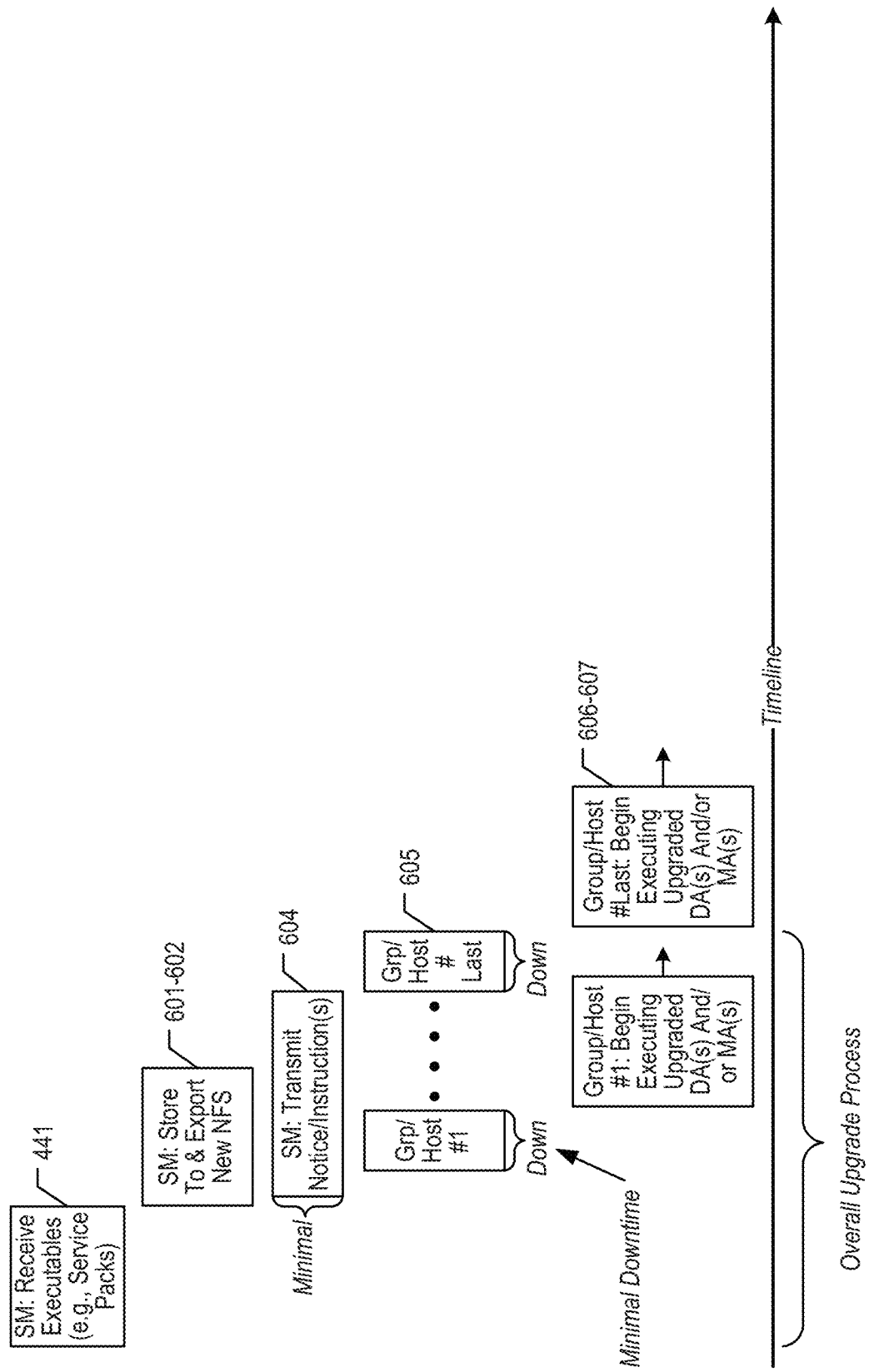
FIG. 7 is an illustrative timeline of the salient operations depicted in method 600 of FIG. 6.

FIG. 7 is an illustrative timeline of the salient operations depicted in method 600 of FIG. 6. This figure may be viewed in contrast to FIG. 2B. The relative durations of the depicted blocks here are merely illustrative and are intended to enhance understanding. As before, the "overall upgrade process" begins when storage manager 340 ("SM") receives one or more upgrades such as service packs (e.g., saved to upgrades cache 441), and ends when the last host computing device or group thereof begins executing upgraded data agents and/or media agents, e.g., begins performing storage management operations after upgrades. The numerical designations of the blocks correspond to elements of FIGS. 3-6, which were described in detail above.

Block 441 represents the storage manager 340 receiving upgrades, e.g., in the form of service packs, which may be stored to upgrade cache 441.

Block 601-602 represents the storage manager 340 preparing before it may communicate with the targeted components, as described in regard to blocks 601-602 in method 600.

Block 604 represents the upgrade-notification of the targeted components. Here storage manager 340 may transmit one or more message(s) notifying/instructing the targeted components of the pending upgrade, as described in detail in regard to operations 471-473, and block 604 of method 600. Notably, block 604 requires minimal bandwidth and/or load on the network (e.g., network 314), because each message or message set addressed to a targeted component is small and carries no payload. At most, it may carry instructions, metadata, and/or operational parameters, e.g., amounting to KBs in length, possibly MBs. No upgrade files (e.g., service packs) are distributed to the targets in block 604. Contrast this solution to operations 261-265, distributed upgrade files to every target, files that may be as big as 2 GB in size for each targeted data agent or media agent. The upgrade files in operations 261-265 thus may be orders of magnitude larger than the messages transmitted in block 604.

Collectively, therefore, the bandwidth and/or network load used up in block 604 may be considered to be minimal as compared to the approach of distributing upgrades to the targeted components described in FIG. 2A. As a result, the amount of time required to transmit the messages of block 604 also should be substantially shorter than the time required to distribute upgrade files such as service packs.

Blocks 605 represent downtime of the targeted components to process the message(s) received from storage manager 340, including releasing from the currently-attached network-shared file system (e.g., 311) and attaching to another network-shared file system (e.g., 301). The time required for these operations may be considered to be minimal, if not altogether negligible. Thus, each targeted data agent and media agent may be non-operational for a minimal time, e.g., second(s), long enough to switch connectivity from one network-shared file system to another. After attaching to the previously-unattached network-shared file system, the upgraded data agent and/or media agent is ready to launch immediately, as shown by the next block. Notably, this approach is not the same as executing a real-time upgrade of each targeted component (see, e.g., operation 271 in FIG. 2B), which may include applying patches and making other changes to installed executables as is well known in the art relative to real-time upgrades.

Moreover, switching from one network-shared file system to another is substantially faster than the real-time upgrade of FIG. 2B.

Blocks 606-607 represent the launch of upgraded data agents and media agents based on executable files being served from the newly-attached network-shared file system (e.g., 301). Notably, the upgraded components here launch from different executable file(s) than the respective predecessor, having switched the source of the executable, e.g., from network-shared file system 311 to 301, at block 605.

As a result, the overall upgrade process may be substantially shortened and improved according to the illustrative embodiment. Contributing factors include the minimal bandwidth and/or network load to transmit messages to the targeted components (e.g., 604) and the substantially shortened downtime required to launch upgraded components due to switching from one network-shared file system to another as the source of executables (e.g., 605). Moreover, because the executable file(s) are stored centrally on a network-shared file system, the local disks of the host computing devices carry less storage burden (e.g., 2 GB per executable file(s)).

In regard to the components, blocks, operations and/or sub-operations described in FIGS. 3-7, other embodiments are possible within the scope of the present invention, such that the above-recited components, steps, blocks, operations, and/or messages/notices/requests/queries/instructions are differently arranged, sequenced, sub-divided, organized, and/or combined. In some embodiments, a different component may initiate or execute a given operation.

Example Embodiments

An exemplary method for performing storage management operations based on executable files served on demand to components of a storage management system may comprise: storing, by a storage manager, one or more executable files of a first data agent to a first network-shared file system, wherein the first data agent is a component of the storage management system; transmitting, by the storage manager, to a second data agent executing on a client computing device, one or more first messages, wherein the first network-shared file system is configures as unattached to the second data agent; in response to the one or more first messages: (i) saving, by the second data agent, to a local storage device associated with the client computing device, metadata relating to the one or more executable files of the first data agent, (ii) releasing, by the second data agent, a second network-shared file system that is configured as attached thereto, (iii) attaching, by the second data agent, to the first network-shared file system, and (iv) stopping execution by the second data agent; executing, by the client computing device, based on the metadata, the one or more executable files of the first data agent, which executable files are served to the client computing device from the attached first network-shared file system; and performing at least one storage management operation, by the first data agent, based on the executing, by the client computing device, of the one or more executable files served from the attached first network-shared file system.

The above-recited method wherein the at least one storage management operation is performed in response to one or more second messages received by the first data agent from the storage manager. The above-recited method wherein the executing, by the client computing device, of the one or more executable files is in response to one or more second messages received from the storage manager. The above-recited method wherein the one or more executable files for the first data agent are served to the client computing device from the attached first network-shared file system based on one or more second messages transmitted by the storage manager. The above-recited method wherein the first data agent is an upgrade of the second data agent.

Another exemplary method for performing storage management operations based on serving executables on demand to components of a storage management system may comprise: storing, by a storage manager, one or more executable files of a first media agent to a first network-shared file system, wherein the first media agent is a component of the storage management system; transmitting, by the storage manager, to a second media agent executing on a secondary storage computing device, one or more first messages, wherein the first network-shared file system is configures as unattached to the second media agent; in response to the one or more first messages: (i) saving, by the second media agent, to a local storage device associated with the secondary storage computing device, metadata relating to the one or more executable files of the first media agent, (ii) releasing, by the second media agent, a second network-shared file system that is configured as attached thereto, and (iii) attaching, by the second media agent, to the first network-shared file system; executing, by the secondary storage computing device, based on the metadata, the one or more executable files of the first media agent, which executable files are served to the secondary storage computing device from the attached first network-shared file system; and performing at least one storage management operation, by the first media agent, based on the executing, by the secondary storage computing device, of the one or more executable files served from the attached first network-shared file system.

The above-recited method wherein the at least one storage management operation is performed in response to one or more second messages received by the first media agent from the storage manager. The above-recited method wherein the executing, by the secondary storage computing device, of the one or more executable files is in response to one or more second messages received from the storage manager. The above-recited method wherein the one or more executable files for the first media agent are served to the secondary storage computing device from the attached first network-shared file system based on one or more second messages transmitted by the storage manager. The above-recited method wherein the first media agent is an upgrade of the second media agent.

Another exemplary method according to an illustrative embodiment may comprise: upgrading a second version of a data agent that executes on a client computing device in a storage management system to a first version of the data agent, wherein the upgrading comprises: storing, by a storage manager, one or more executable files of the first version of the data agent to a first network-shared file system, which is configured as unattached to the second version of the data agent; transmitting, by the storage manager, one or more first messages to the second version of the data agent; in response to the one or more first messages received from the storage manager: (i) saving, by the second version of the data agent, to a local storage device associated with the client computing device, metadata relating to the one or more executable files of the first version of the data agent, (ii) releasing, by the second version of the data agent, a second network-shared file system that is configured as attached thereto, (iii) attaching, by the second version of the data agent, to the first network-shared file system, and (iv) stopping execution of the second version of the data agent; and executing the first data agent on the client computing device, based at least in part on the metadata and the one or more executable files of the first version of the data agent, which executable files are served to the client computing device from the attached first network-shared file system.

The above-recited method may further comprise: performing at least one storage management operation, by the first version of the data agent, based on the executing, by the client computing device, of the one or more executable files served from the attached first network-shared file system. The above-recited method may further comprise: performing at least one storage management operation, by the first version of the data agent, based on the executing, by the client computing device, of the one or more executable files served from the attached first network-shared file system; wherein the storage management operation is at least part of at least one of making a backup copy of primary data associated with the data agent, making an archive copy of the primary data, and taking a snapshot of the primary data.

Another exemplary method for upgrading a media agent in a storage management system to a different version of the media agent, wherein the method may comprise: upgrading a media agent that executes on a secondary storage computing device in a storage management system from a second version to a first version, wherein the upgrading comprises: storing, by a storage manager, one or more executable files of the first version of the media agent to a first network-shared file system, which is configured as unattached to the second version of the media agent; transmitting, by the storage manager, one or more first messages to the second version of the media agent; in response to the one or more first messages received from the storage manager: (i) saving, by the second version of the media agent, to a local storage device associated with the secondary storage computing device, metadata relating to the one or more executable files of the first version of the media agent, (ii) releasing, by the second version of the media agent, a second network-shared file system that is configured as attached thereto, and (iii) attaching, by the second version of the media agent, to the first network-shared file system; and executing the first version of the media agent on the secondary storage computing device, based at least in part on the metadata and the one or more executable files of the first version of the media agent, which executable files are served to the secondary storage computing device from the attached first network-shared file system.

The above-recited method may further comprise: performing at least one storage management operation, by the first version of the media agent, based on the executing, by the secondary storage computing device, of the one or more executable files served from the attached first network-shared file system. The above-recited method may further comprise: performing at least one storage management operation, by the first version of the media agent, based on the executing, by the secondary storage computing device, of the one or more executable files served from the attached first network-shared file system; wherein the storage management operation is at least part of at least one of making a backup copy of primary data associated with the media agent, making an archive copy of the primary data, and taking a snapshot of the primary data.

An exemplary storage management system for performing storage management operations based on executable files served on demand to components of the storage management system, which system may comprise: one or more executable files of a first storage management agent, wherein the storage management agent is one of a data agent and a media agent; a computing device that hosts a second storage management agent; a local storage device associated with the computing device; a first network-shared file system configured as detached from the computing device; a second network-shared file system configured as attached to the computing device; a storage manager in communication with the computing device, the first network-shared file system, and the second network-shared file system; wherein the storage manager is configured to store the one or more executable files of the first storage management agent to the first network-shared file system; transmit one or more first messages to the second storage management agent, wherein the one or more first messages instruct the second storage management agent to: (i) save metadata relating to the one or more executable files of the first storage management agent to the local storage device, (ii) release the second network-shared file system, (iii) attach to the first network-shared file system, and (iv) stop execution of the second storage management agent; and transmit to the computing device one or more second messages that instruct the computing device to activate the first storage management agent by executing the one or more executable files served from the first network-shared file system; and wherein the computing device is configured to, in response to the one or more second messages received from the storage manager, execute the one or more executable files served from the first network-shared file system, thereby activating the first storage management agent on the computing device.

The above-recited system wherein a storage management operation performed by the first storage management agent is based at least in part on the one or more executable files served to the computing device from the first network-shared file system. The above-recited system wherein the first storage management agent is configured to perform at least one storage management operation based on the execution by the computing device of the one or more executable files served by the first network-shared file system. The above-recited system wherein the second storage management agent is further configured to, in response to the one or more first messages from the storage manager: (i) save the metadata relating to the one or more executable files of the first storage management agent to the local storage device, (ii) release the second network-shared file system, (iii) attach to the first network-shared file system, and (iv) stop executing.

Another exemplary storage management system for performing storage management operations based on executable files served on demand to components of the storage management system, which system may comprise: one or more executable files of a first data agent; a client computing device that hosts a second data agent; a local storage device associated with the client computing device; a first network-shared file system configured as detached from the client computing device; a second network-shared file system configured as attached to the client computing device; a storage manager in communication with the client computing device, the first network-shared file system, and the second network-shared file system; wherein the storage manager is configured to store the one or more executable files of the first data agent to the first network-shared file system; transmit one or more first messages to the second data agent, wherein the one or more first messages instruct the second data agent to: (i) save metadata relating to the one or more executable files of the first data agent to the local storage device, (ii) release the second network-shared file system, (iii) attach to the first network-shared file system, and (iv) stop execution of the second data agent; and transmit to the client computing device one or more second messages that instruct the client computing device to activate the first data agent by executing the one or more executable files served from the first network-shared file system; and wherein the client computing device is configured to, in response to the one or more second messages received from the storage manager, execute the one or more executable files served from the first network-shared file system, thereby activating the first data agent on the client computing device.

The above-recited system wherein a storage management operation performed by the first data agent is based at least in part on the one or more executable files served to the first client computing device from the first network-shared file system. The above-recited system wherein the first data agent is configured to perform at least one storage management operation based on the execution by the client computing device of the one or more executable files served by the first network-shared file system. The above-recited system wherein the second data agent is further configured to, in response to the one or more first messages from the storage manager: (i) save the metadata relating to the one or more executable files of the first data agent to the local storage device, (ii) release the second network-shared file system, (iii) attach to the first network-shared file system, and (iv) stop executing.

Another exemplary storage management system for performing storage management operations based on executable files served on demand to components of the storage management system, which system may comprise: one or more executable files of a first media agent; a secondary storage computing device that hosts a second media agent; a local storage device associated with the secondary storage computing device; a first network-shared file system configured as detached from the secondary storage computing device; a second network-shared file system configured as attached to the secondary storage computing device; a storage manager in communication with the secondary storage computing device, the first network-shared file system, and the second network-shared file system; wherein the storage manager is configured to store the one or more executable files of the first media agent to the first network-shared file system; transmit one or more first messages to the second media agent, wherein the one or more first messages instruct the second media agent to: (i) save metadata relating to the one or more executable files of the first media agent to the local storage device, (ii) release the second network-shared file system, (iii) attach to the first network-shared file system, and (iv) stop execution of the second media agent; and transmit to the secondary storage computing device one or more second messages that instruct the secondary storage computing device to activate the first media agent by executing the one or more executable files served from the first network-shared file system; and wherein the secondary storage computing device is configured to, in response to the one or more second messages received from the storage manager, execute the one or more executable files served from the first network-shared file system, thereby activating the first media agent on the secondary storage computing device.

The above-recited system wherein a storage management operation performed by the first media agent is based at least in part on the one or more executable files served to the first secondary storage computing device from the first network-shared file system. The above-recited system wherein the first media agent is configured to perform at least one storage management operation based on the execution by the secondary storage computing device of the one or more executable files served by the first network-shared file system. The above-recited system wherein the second media agent is further configured to, in response to the one or more first messages from the storage manager: (i) save the metadata relating to the one or more executable files of the first media agent to the local storage device, (ii) release the second network-shared file system, (iii) attach to the first network-shared file system, and (iv) stop executing.

Another illustrative method for upgrading a storage management component in a storage management system to a different version of the storage management component, wherein the method may comprise: upgrading a storage management component that executes on a host computing device in a storage management system from a second version to a first version, wherein the upgrading comprises: storing, by a storage manager, one or more executable files of the first version of the storage management component to a first network-shared file system, which is configured as unattached to the second version of the storage management component; in response to one or more first messages received from the storage manager: (i) saving, by the second version of the storage management component, to a local storage device associated with the host computing device, metadata relating to the one or more executable files of the first version of the storage management component, (ii) releasing, by the second version of the storage management component, a second network-shared file system that is configured as attached thereto, and (iii) refreshing a network-shared connection that attaches to the first network-shared file system; and executing the first version of the storage management component on the host computing device, based at least in part on the metadata and the one or more executable files of the first version of the storage management component, which executable files are served to the host computing device from the attached first network-shared file system.

The above-recited illustrative method wherein the storage management component is at least one of a data agent and a media agent. The above-recited illustrative method wherein the host computing device is at least one of a client computing device and a secondary storage computing device. The above-recited illustrative method may further comprise: performing at least one storage management operation, by the first version of the storage management component, based on the executing, by the host computing device, of the one or more executable files served from the attached first network-shared file system. The above-recited illustrative method may further comprise: performing at least one storage management operation, by the first version of the storage management component, based on the executing, by the host computing device, of the one or more executable files served from the attached first network-shared file system; and wherein the storage management operation is at least part of at least one of: making a backup copy of primary data, making an archive copy of the primary data, and taking a snapshot of the primary data.

Another exemplary method for upgrading a storage management component in a storage management system to a different version of the storage management component, wherein the method may comprise: upgrading a storage management component that executes on a host computing device in a storage management system from a second version to a first version, wherein the upgrading is based on refreshing a connection to a designated network-shared file system, wherein the upgrading comprises: storing, by a storage manager, one or more executable files of the first version of the storage management component to a first network-shared file system, which is configured as unattached to the second version of the storage management component; in response to one or more first messages received from the storage manager: (i) saving, by the second version of the storage management component, to a local storage device associated with the host computing device, metadata relating to the one or more executable files of the first version of the storage management component, (ii) releasing, by the second version of the storage management component, a second network-shared file system that is configured as attached thereto before the refreshing of the connection to the designated network-shared file system, wherein the refreshed connection attaches to the first network-shared file system which comprises the one or more executable files of the first version of the storage management component; and executing the first version of the storage management component on the host computing device, based at least in part on the metadata and the one or more executable files of the first version of the storage management component, which executable files are served to the host computing device from the attached first network-shared file system.

The above-recited exemplary method wherein the storage management component is at least one of a data agent and a media agent. The above-recited exemplary method wherein the host computing device is at least one of a client computing device and a secondary storage computing device. The above-recited exemplary method may further comprise: performing at least one storage management operation, by the first version of the storage management component, based on the executing, by the host computing device, of the one or more executable files served from the attached first network-shared file system. The above-recited exemplary method may further comprise: performing at least one storage management operation, by the first version of the storage management component, based on the executing, by the host computing device, of the one or more executable files served from the attached first network-shared file system; and wherein the storage management operation is at least part of at least one of: making a backup copy of primary data, making an archive copy of the primary data, and taking a snapshot of the primary data.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the appli-cant reserves the right to pursue additional claims after filing this application, in either this application or in a continuing application.

What is claimed is:

1. A method for serving different versions of storage management components from network-attached storage, the method comprising:
by a second version of a storage management component that executes on a first computing device, receiving from a storage manager:
(A) metadata about a first version of the storage management component, wherein executable files of the first version of the storage management component are stored on a first network-attached storage in communication with the storage manager and unattached to the first computing device,
(B) instructions to refresh a designated connection to network-attached storage, and
wherein the first computing device comprises one or more hardware processors, and wherein the storage manager executes on a second computing device comprising one or more hardware processors;
by the second version of the storage management component, storing the metadata to the first computing device;
by the second version of the storage management component, causing the designated connection to network-attached storage to be refreshed, comprising releasing an attached second network-attached storage and attaching to the first network-attached storage;
after completion of storage management operations that are underway involving the second version of the storage management component, stopping the second version of the storage management component from executing further on the first computing device;
based at least in part on the metadata stored at the first computing device, reading, into a main memory configured in the first computing device, the executable files of the first version of the storage management component from the attached first network-attached storage;
changing the storage management component at the first computing device from the second version to the first version by executing the executable files of the first version of the storage management component, and
by the first version of the storage management component executing on the first computing device, taking part in at least one further storage management operation managed by the storage manager.

2. The method of claim 1 further comprising:
from among a plurality of storage management components operating in a storage management system, targeting by the storage manager one or more storage management components for changing the storage management component from the second version to the first version; and
wherein only the targeted one or more storage management components receive from the storage manager the metadata and the instructions to refresh.

3. The method of claim 1, wherein the second version of the storage management component further receives from the storage manager (C) instructions that the second version of the storage management component is to stop executing after it completes storage management operations that are underway.

4. The method of claim 1, wherein the at least one further storage management operation in which the first version of the storage management component participates is one of: a backup to a secondary storage device, an archiving to the secondary storage device, a replicating to the secondary storage device, and a restore from a secondary copy associated with the secondary storage device.

5. The method of claim 1, wherein at least some of the metadata is extracted by the storage manager from the executable files of the first version of the storage management component which are stored in the first network-attached storage.

6. The method of claim 1, wherein when the first network-attached storage is attached to the first computing device, the first network-attached storage provides a first network-shared file system to the first computing device for serving thereto the executable files of the first version of the storage management component.

7. The method of claim 1, wherein the storage management component is associated with an application that executes on the first computing device;
  in regard to a plurality of storage management operations managed by the storage manager with reference to the application:
    the second version of the storage management component participates in a first subset of the plurality of storage management operations before the reading, into the main memory configured in the first computing device, of the executable files of the first version of the storage management component from the attached first network-attached storage, and
    the first version of the storage management component participates in a second subset of the plurality of storage management operations after the reading.

8. The method of claim 1, wherein the storage management component is one of a media agent and a data agent.

9. A storage management system comprising:
  a first network-attached storage, configured as detached from a first computing device, and comprising a first network-shared file system;
  a second network-attached storage, configured as attached to the first computing device, and comprising a second network-shared file system;
  a storage manager for managing storage management operations in the storage management system, wherein the storage manager is in communication with the first network-attached storage and with the second network-attached storage, and wherein the storage manager executes on a second computing device comprising one or more hardware processors;
  a storage management agent that executes on the first computing device, which comprises one or more hardware processors; and
  wherein the first computing device is configured to:
    by a second version of the storage management agent, receive from the storage manager: (A) metadata about a first version of the storage management agent, and (B) instructions to refresh a designated connection to network-attached storage,
    refresh the designated connection to network-attached storage, comprising releasing the attached second network-attached storage and attaching to the first network-attached storage,
    after completion of storage management operations that are underway involving the second version of the storage management agent, stop execution of the second version of the storage management agent,
    based at least in part on the metadata received from the storage manager, read into a main memory, which is configured in the first computing device, executable files of the first version of the storage management agent from the first network-shared file system,
    changing the storage management agent on the first computing device from the second version to the first version by executing the executable files of the first version of the storage management agent, and
    by the first version of the storage management agent, execute further storage management operations.

10. The storage management system of claim 9, wherein the metadata is extracted by the storage manager from the executable files of the first version of the storage management agent, which are stored in the first network-shared file system.

11. The storage management system of claim 9, wherein the first computing device executes the executable files of the first version of the storage management agent based on further instructions received from the storage manager.

12. The storage management system of claim 9, wherein the storage manager is configured to target, from among a plurality of storage management agents operating in the storage management system, one or more storage management agents that execute on one or more respective target computing devices for changing from the second version to the first version; and
  wherein only the one or more respective target computing devices receive from the storage manager the metadata and the instructions to refresh.

13. The storage management system of claim 9, wherein the second version of the storage management agent further receives from the storage manager (C) instructions that the second version of the storage management agent is to stop executing after it completes storage management operations that are underway.

14. The storage management system of claim 9, wherein the further storage management operations comprise at least one of: a backup, an archiving, a replicating, and a restore from a secondary copy.

15. A non-transitory computer-readable medium storing instructions that, when executed by a first computing device comprising one or more hardware processors, cause the first computing device to perform operations comprising:
  by a second version of a storage management agent that executes on the first computing device, receive from a storage manager: (A) metadata about a first version of the storage management agent, and (B) instructions to refresh a designated connection to network-attached storage,
  refresh the designated connection, comprising releasing an attached second network-attached storage and attaching to a first network-attached storage,
  after completion of storage management operations that are underway involving the second version of the storage management agent, cause the second version of the storage management agent to stop executing,
  based at least in part on the metadata received from the storage manager, read into a main memory, which is configured in the first computing device, executable files of the first version of the storage management agent from the first network-attached storage,
  change the storage management agent on the first computing device from the second version to the first version by executing the executable files of the first version of the storage management agent, and
  execute further storage management operations by the first version of the storage management agent.

16. The non-transitory computer-readable medium of claim 15, wherein the second version of the storage management agent further receives from the storage manager (C) instructions that the second version of the storage management agent is to stop executing after it completes the storage management operations that are underway.

17. The non-transitory computer-readable medium of claim 15, wherein when the first network-attached storage is attached to the first computing device, the first network-attached storage provides a network-shared file system to the first computing device for serving thereto the executable files of the first version of the storage management agent.

18. The non-transitory computer-readable medium of claim 15, wherein in regard to a plurality of storage management operations for data generated by the first computing device, a first subset of the plurality of storage management operations are performed using the second version of the storage management agent before the change, and after the change the plurality of storage management operations resume using the first version of the storage management agent.

19. The non-transitory computer-readable medium of claim 15, wherein after the change, the first version of the storage management agent receives instructions from the storage manager to resume the further storage management operations.

20. The non-transitory computer-readable medium of claim 15, wherein the storage management agent is one of a media agent and a data agent.

\* \* \* \* \*